(12) United States Patent
Mockry et al.

(10) Patent No.: US 7,384,026 B2
(45) Date of Patent: Jun. 10, 2008

(54) HEATING TOWER APPARATUS AND METHOD WITH WIND DIRECTION ADAPTATION

(75) Inventors: Eldon F. Mockry, Lenexa, KS (US); Jidong Yang, Overland Park, KS (US); Larry F. Burdick, Olathe, KS (US)

(73) Assignee: Spx Cooling Technologies Inc., Overland Park, KS (US)

( * ) Notice: Subject to any disclaimer, the term of this patent is extended or adjusted under 35 U.S.C. 154(b) by 332 days.

(21) Appl. No.: 11/298,744

(22) Filed: Dec. 12, 2005

(65) Prior Publication Data

US 2007/0132116 A1    Jun. 14, 2007

Related U.S. Application Data

(63) Continuation-in-part of application No. 10/942,939, filed on Sep. 17, 2004, now Pat. No. 7,137,619, and a continuation-in-part of application No. 10/942,940, filed on Sep. 17, 2004, now Pat. No. 7,137,623, and a continuation-in-part of application No. 11/181,863, filed on Jul. 15, 2005, now Pat. No. 7,320,458, and a continuation-in-part of application No. 11/181,864, filed on Jul. 15, 2005.

(51) Int. Cl.
  *B01F 3/04* (2006.01)
(52) U.S. Cl. .................. 261/61; 261/109; 261/DIG. 11
(58) Field of Classification Search .................. 261/30, 261/42, 44.1, 53, 61, 109, DIG. 11
See application file for complete search history.

(56) References Cited

U.S. PATENT DOCUMENTS

| 3,600,653 A | * | 8/1971 | Hall ............................... 95/62 |
| 3,933,196 A | * | 1/1976 | Heller et al. ................ 165/100 |
| 4,217,317 A | * | 8/1980 | Neu ........................... 261/160 |
| 4,315,873 A | * | 2/1982 | Smith et al. ................ 261/158 |
| 6,070,860 A | | 6/2000 | Kinney, Jr. et al. |
| 6,622,492 B1 | | 9/2003 | Eyermann |

FOREIGN PATENT DOCUMENTS

| DE | 90 01 971 U1 | 6/1990 |
| DE | 43 40 654 A1 | 6/1995 |
| EP | 0 390 990 A1 | 10/1990 |
| FR | 2 360 059 | 2/1978 |
| GB | 616032 | 1/1949 |
| JP | 09257279 | 9/1997 |

* cited by examiner

*Primary Examiner*—Scott Bushey
(74) *Attorney, Agent, or Firm*—Baker & Hostetler LLP

(57) ABSTRACT

A heating tower apparatus for heating a liquid. The heating tower includes a frame assembly, liquid distribution assembly and a fill medium. The heating tower additionally includes a hood that extends from the frame assembly. A shroud is disposed within the hood and the hood provides an air flow outlet. The heating tower further includes a track connected to the frame assembly along with a first door connected to the track and a second door connected to the track. The first door moves along the track between the hood and a first air flow inlet while the second door moves along the track between the hood and a second air flow outlet. The heating tower also includes first and second winches that operate to move the first and second doors along the track.

17 Claims, 16 Drawing Sheets

HEATING TOWER APPARATUS AND METHOD WITH WIND DIRECTION ADAPTATION

PRIORITY CLAIM

This application claims priority under 35 U.S.C. 120 to the following applications, each of which has at least one common inventor with this application. This application is a CIP of application Ser. No. 10/942,939, entitled, HEATING TOWER APPARATUS AND METHOD WITH WIND DIRECTION ADAPTATION, filed Sep. 17, 2004, now U.S. Pat. No. 7,137,619. This application is also a CIP of application Ser. No. 10/942,940, entitled, HEATING TOWER APPARATUS AND METHOD WITH ISOLATION OF OUTLET AND INLET AIR, filed Sep. 17, 2004, now U.S. Pat. No. 7,137,623. This application is also a CIP of application Ser. No. 11/181,863, entitled, HEATING TOWER APPARATUS AND METHOD WITH ISOLATION OF OUTLET AND INLET AIR, filed Jul. 15, 2005, now U.S. Pat. No. 7,320,458. This application is also a CIP of application Ser. No. 11/181,864, entitled, HEATING TOWER APPARATUS AND METHOD WITH WIND DIRECTION ADAPTATION, filed Jul. 15, 2005. Each of the specifications of the above listed applications are herein incorporated by reference.

FIELD OF THE INVENTION

This invention relates generally to an apparatus and method for imparting heat to a circulating fluid by water heated by a heating tower apparatus. More particularly, the present invention relates, for example, to an apparatus and method whereby liquefied natural gas or the like, is vaporized via heat exchange.

BACKGROUND OF THE INVENTION

There are times when it is desirable to impart heat from ambient air to a relatively cool liquid to "heat" or cool the liquid. This circumstance can arrive with respect to liquefied natural gas.

The cryogenic liquefaction of natural gas is routinely practiced as a means for converting natural gas into a more convenient form for transportation. Such liquefaction typically reduces the volume by about 600 fold and results in an end product that can be stored and transported more easily. Also, it is desirable to store excess natural gas so that it may be easily and efficiently supplied when the demand for natural gas increases. One practical means for transporting natural gas and also for storing excess natural gas is to convert the natural gas to a liquefied state for storage and/or transportation and then vaporize the liquid, as demand requires.

Natural gas often is available in areas remote from where it will ultimately be used, therefore the liquefaction of natural gas is even of greater importance. Typically, natural gas is transported via pipeline from the supply source directly to the user market. However, it has become more common that the natural gas be transported from a supply source which is separated by great distances from the user market, where a pipeline is either not available or is impractical. This is particularly true of marine transportation where transport must be made by ocean-going vessels. Ship transportation of natural gas in the gaseous state is generally not practical because of the great volume of the gas in the gaseous state, and because appreciable pressurization is required to significantly reduce the volume of the gas. Therefore, in order to store and transport natural gas, the volume of the gas is typically reduced by cooling the gas to approximately −240° F. to approximately −260° F. At this temperature, the natural gas is converted into liquefied natural gas (LNG), which possesses near atmospheric vapor pressure. Upon completion of transportation and/or storage of the LNG, the LNG must be returned to the gaseous state prior to providing the natural gas to the end user for consumption.

Typically, the re-gasification or vaporization of LNG is achieved through the employment of various heat transfer fluids, systems and processes. For example, some processes used in the art utilize evaporators that employ hot water or steam to heat the LNG to vaporize it. These heating processes have drawbacks however because the hot water or steam oftentimes freezes due to the extreme cold temperatures of the LNG which in turn causes the evaporators to clog. In order to overcome this drawback, alternative evaporators are presently used in the art, such as open rack evaporators, intermediate fluid evaporators and submerged combustion evaporators.

Open rack evaporators typically use sea water or like as a heat source for countercurrent heat exchange with LNG. Similar to the evaporators mentioned above, open rack evaporators tend to "ice up" on the evaporator surface, causing increased resistance to heat transfer. Therefore, open rack evaporators must be designed having evaporators with increased heat transfer area, which entails a higher equipment cost and increased foot print of the evaporator.

Instead of vaporizing LNG by direct heating by water or steam, as described above, evaporators of the intermediate type employ an intermediate fluid or refrigerant such as propane, fluorinated hydrocarbons or the like, having a low freezing point. The refrigerant can be heated with hot water or steam, and then the heated refrigerant or refrigerant mixture is passed through the evaporator and used to vaporize the LNG. Evaporators of this type overcome the icing and freezing episodes that are common in the previously described evaporators, however these intermediate fluid evaporators require a means for heating the refrigerant, such as a boiler or heater. These types of evaporators also have drawbacks because they are very costly to operate due to the fuel consumption of the heating means used to heat the refrigerant.

One practice currently employed in the art to overcome the high cost of operating boilers or heaters is the use of water towers, by themselves or in combination with the heaters or boilers, to heat the refrigerant that acts to vaporize the LNG. In these systems, water is passed into a water tower wherein the temperature of the water is elevated. The elevated temperature water is then used to heat the refrigerant such as glycol via a first evaporator, which in turn is used to vaporize the LNG via a second evaporator. These systems also have drawbacks however in terms of the buoyancy differential between the tower inlet steam and the tower outlet steam. The heating towers discharge large quantities of cold moist air or effluent that is very heavy compared to the ambient air. Once the cold effluent is discharged from the tower, it tends to want to sink or travel to ground because it is so much heavier than the ambient air. The cold effluent is then drawn into the water tower, hindering the heat exchange properties of the tower and causing tower to be inefficient. The aforementioned buoyancy problem causes the recirculation of cold air through water towers, hindering their ability to heat the water and essentially limiting the effectiveness of the towers.

Accordingly, there is a need in the art to provide an improved apparatus and method for imparting heat to a circulating fluid by a heating tower apparatus. It is desirable to have such apparatus and method to accomplish the vaporization of LNG that in an efficient and cost effective manner. Furthermore, there is a need in the art to provide a heating tower for use in the LNG vaporization process and/or in a vaporization system that enables the process and/or system to effectively heat water and enable the process to be more efficient and cost effective.

SUMMARY OF THE INVENTION

The foregoing needs are met, to a great extent, by the present invention, wherein aspects of a heating tower apparatus and method are provided.

In accordance with one embodiment of the present invention, a method for heating a fluid using a heating tower is provided, comprising the steps of: drawing an air stream into the heating tower through an inlet; passing the air stream over a fill medium; passing the fluid over the fill medium; discharging the air steam from the heating tower through an outlet; and isolating the inlet air stream from the outlet air stream.

In accordance with another embodiment of the present invention, a heating tower apparatus for heating a liquid is provided having an air flow inlet that provides an inlet air flow stream. The inlet includes an inlet duct. The heating tower also includes an air flow outlet that provides an outlet air flow stream. The inlet duct operates to isolate the inlet air flow stream for the outlet air flow stream. The heating tower further includes at least one heating tower cell connected to the inlet duct and the outlet. The heating tower cell comprises a liquid distribution assembly along with a fill medium, wherein the liquid distribution assembly distributes liquid onto the fill medium.

In accordance with yet another embodiment of the present invention, a heating tower apparatus for heating a liquid is provided having an air flow inlet that provides an inlet air flow stream. The heating tower also includes an air flow outlet having an outlet duct that provides an outlet air flow stream. The outlet duct operates to isolate the inlet air flow stream for the outlet air flow stream. The heating tower further includes at least one heating tower cell connected to the inlet and the outlet duct. The heating tower cell comprises a liquid distribution assembly along with a fill medium, wherein the liquid distribution assembly distributes liquid onto the fill medium.

In accordance with still another embodiment of the present invention, a heating tower apparatus for heating a liquid is provided having an air flow inlet that provides an inlet air flow stream and an air flow outlet that provides an outlet air flow stream. The inlet duct operates to isolate the inlet air flow stream for the outlet air flow stream. The heating tower further includes at least one heating tower cell connected to the inlet duct and the outlet. The heating tower cell comprises a liquid distribution assembly along with a fill medium, wherein the liquid distribution assembly distributes liquid onto the fill medium. The heating tower additionally includes a housing that isolates the inlet air flow stream from the outlet air flow stream.

In accordance with another embodiment of the present invention, a heating tower apparatus for heating a liquid is provided. The tower includes an air flow inlet that provides an inlet air flow stream along with a plurality of heating tower cells, each connected to the inlet. Each of the heating tower cells comprises a liquid distribution assembly along with fill medium and an air flow outlet that provides an outlet air flow stream. The heating tower also includes a housing that extends over each of the air flow outlets of the heating tower cells that isolates the inlet air flow stream from the outlet air flow stream.

In accordance with yet a further embodiment of the present invention, a heating tower apparatus for heating a liquid is provided, comprising: means for drawing an air stream into the heating tower through an inlet; means for passing the air stream over a fill medium; means for passing the fluid over the fill medium; means for discharging the air steam from the heating tower through an outlet; and means for isolating the inlet air stream from the outlet air stream.

In accordance with another embodiment of the present invention, an air guide for a heating tower is provided. The air guide includes an air flow inlet, which provides an inlet air flow stream. The air guide also includes an air flow outlet, which provides an outlet air flow stream. During operation, the air guide isolates the inlet air flow stream from the outlet air flow stream.

In accordance with another embodiment of the present invention, a heating tower apparatus for heating a liquid which falls in a generally downward direction along a vertical axis is provided, comprising: a first air flow inlet that provides a first inlet air flow stream, wherein said first air flow inlet has a first inlet door that moves between an open and a closed position; a second air flow inlet that provides a second inlet air flow stream, wherein said second air flow inlet has a second inlet door that moves between an open and a closed position; a first air flow outlet that provides a first outlet air flow stream, wherein said first air flow inlet has a first outlet door that moves between an open and a closed position; a second air flow outlet that provides a second outlet air flow stream, wherein said second air flow inlet has a second outlet door that moves between an open and a closed position; a liquid distribution assembly; and a fill medium, wherein said liquid distribution assembly distributes liquid onto said fill medium, wherein the heating tower is operable in a first configuration in which said first inlet door is in the open position, said second inlet door is in the closed position, said first outlet door is in the open position and wherein said second outlet door is in the closed position, and wherein the heating tower is operable in a second configuration in which said first inlet door is in the closed position, said second inlet door is in the open position, said first outlet door is in the closed position and wherein said second outlet door is in the open position, and wherein the tower can be switched between the first configuration and the second configuration.

In accordance with another embodiment of the present invention, a heating tower apparatus for heating a liquid which falls in a generally downward direction along a vertical axis is provided, comprising: more than one inlet; more than one outlet; a liquid distribution assembly; and a fill medium, wherein said liquid distribution assembly distributes liquid onto said fill medium, wherein each of said more than one inlet and said more than one outlet is selectively openable and closable.

In accordance with still another embodiment, a heating tower apparatus for heating a liquid which falls in a generally downward direction along a vertical axis is provided, comprising: a first air flow inlet that provides a first inlet air flow stream, wherein said first air flow inlet has a first inlet door that moves between an open and a closed position; a second air flow inlet that provides a second inlet air flow stream, wherein said second air flow inlet has a second inlet door that moves between an open and a closed position, wherein during operation of the heating tower, said first inlet door is in the open position, said second inlet door is in the closed position; an air flow outlet that provides a first outlet air flow stream, wherein said air flow inlet is connected to a rotatable outlet duct; a liquid distribution assembly; and a fill medium, wherein said liquid distribution assembly distributes liquid onto said fill medium, wherein said outlet duct directionally rotates about the vertical axis over the air flow outlet to isolate the inlet air flow stream from the outlet air flow stream.

In accordance with another embodiment of the present invention, a heating tower apparatus for heating a liquid which falls in a generally downward direction along a vertical axis is provided, comprising: a first air flow inlet that provides a first inlet air flow stream, wherein said first air flow inlet has a first inlet door that moves between an open and a closed position; a second air flow inlet that provides a second inlet air flow stream, wherein said second air flow inlet has a second inlet door that moves between an open and a closed position, wherein during operation of the heating tower, said first inlet door is in the closed position and said second inlet door is in the open position; an air flow outlet that provides a first outlet air flow stream, wherein said air flow inlet is connected to a rotatable outlet duct; a liquid distribution assembly; and a fill medium, wherein said liquid distribution assembly distributes liquid onto said fill medium, wherein said inlet duct directionally rotates about the vertical axis over the first and second air flow inlets to isolate the inlet air flow stream from the outlet air flow stream.

In accordance with a further embodiment of the present invention, a method for heating a liquid using a heating tower is provided, comprising the steps of: actuating a first inlet door to an open position, opening a first air flow inlet; actuating a first outlet door to an open position, opening a first air flow outlet; drawing an air stream into the heating tower through the first air flow inlet; passing the air stream over a fill medium; discharging the air stream from the heating tower through the first air flow outlet; and isolating the inlet air stream for the outlet air stream.

In accordance still another embodiment of the present invention, a heating tower apparatus for heating a liquid which falls in a generally downward direction along a vertical axis is provided, comprising: a first air flow inlet that provides a first inlet air flow stream, wherein said first air flow inlet is selectively openable and closable; a second air flow inlet that provides a second air flow stream, wherein said second air flow inlet is selectively openable and closable; an air flow outlet that provides an outlet air flow stream; a series of rotatable vanes that extend at least partially all the way across said air flow outlet; a liquid distribution assembly; and a fill medium, wherein said liquid distribution assembly distributes liquid onto said fill medium.

In accordance with another embodiment, a heating tower apparatus for heating a liquid which falls in a generally downward direction along a vertical axis, wherein the heating tower has opposing first and second side walls, is provided comprising: a frame assembly that supports the heating tower; a liquid distribution assembly; a fill medium, wherein said liquid distribution assembly distributes liquid onto said fill medium; a hood that extends from said frame assembly, wherein said hood has a diameter D and has a shroud disposed therein and wherein said hood provides an air flow outlet; a track connected to said frame assembly, wherein said track extends at least partially around said frame assembly and said hood; a first air flow inlet that provides a first inlet air flow stream; a second air flow inlet that provides a second inlet air flow stream; a first door connected to said track, wherein said first door moves along said track between said hood and said first air flow inlet; a second door connected to said track, wherein said second door moves along said track between said hood and said second air flow inlet; a first actuating apparatus mounted to said frame assembly, wherein said first actuating apparatus is connected to said first door and extends and retracts said first door between the hood and the first air flow inlet; and a second actuating apparatus mounted to said frame assembly, wherein said second actuating apparatus is connected to said second door and extends and retracts said second door between said hood and said second air flow inlet, wherein the heating tower is operable in a first configuration in which said first door is extended in a first position on said hood and said second door is retracted in a second position over said second air flow inlet and wherein said first air flow inlet is open in said first configuration and said second air flow inlet is closed in said first configuration.

In accordance with another embodiment of the present invention, a method for heating a liquid using a heating tower is provided, comprising: actuating a first door along a track to a first position on a hood having a diameter D using a first actuating apparatus, wherein in the first position a first air flow inlet is open and a first air flow outlet is provided; actuating a second door along said track using a second actuating apparatus to a second position, wherein in the second position a second air flow inlet is closed; drawing an air stream into the heating tower through the first air flow inlet; passing the air stream over a fill medium; discharging the air stream from the heating tower through the first air flow outlet; and isolating the inlet air flow stream from the outlet air flow stream.

In accordance with yet another embodiment of the present invention, a heating tower apparatus for heating a liquid which falls in a generally downward direction along a vertical axis, wherein the heating tower has opposing first and second side walls is provided, comprising: means for actuating a first door along a track to a first position on a hood having a diameter D, wherein in the first position a first air flow inlet is open and a first air flow outlet is provided; means for actuating a second door along said track to a second position, wherein in the second position a second air flow inlet is closed; means for drawing an air stream into the heating tower through the first air flow inlet; means for passing the air stream over a fill medium; means for discharging the air stream from the heating tower through the first air flow outlet; and means for isolating the inlet air flow stream from the outlet air flow stream.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
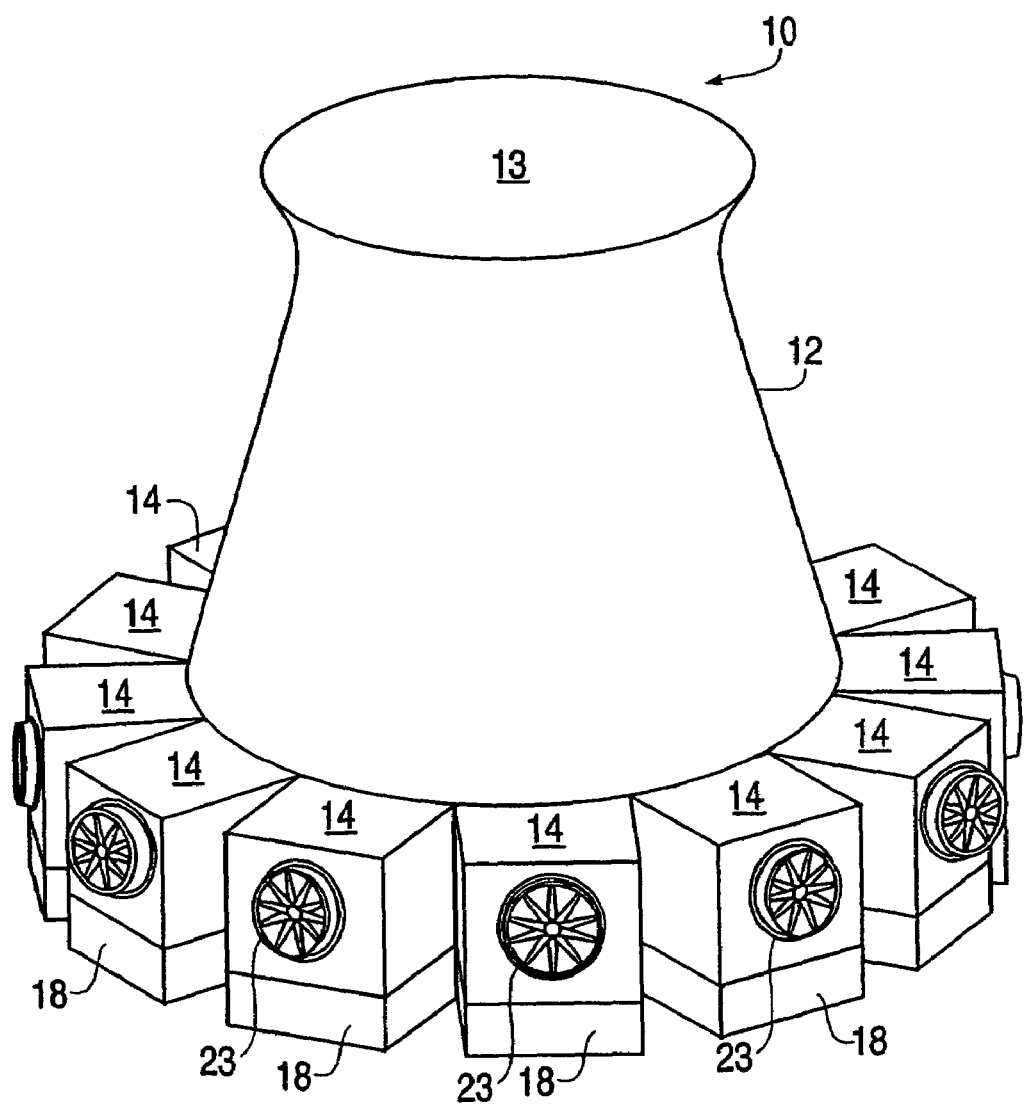
FIG. 1 is a side perspective view of a heating tower in accordance with an embodiment of the present invention.

Various preferred embodiments of the present invention provide for a heating tower apparatus and method for heating a liquid such as water or the like. In some arrangements, the heating tower and apparatus are utilized in vaporization or gasification systems and/or processes utilized for the vaporization of liquid natural gas (LNG). It should be understood, however, that the present invention is not limited in its application to LNG vaporization processes, but, for example, can be used with other systems and/or other processes that require the addition of heat to a liquid or the like. Preferred embodiments of the invention will now be further described with reference to the drawing figures, in which like reference numerals refer to like parts throughout.

Figure 2:
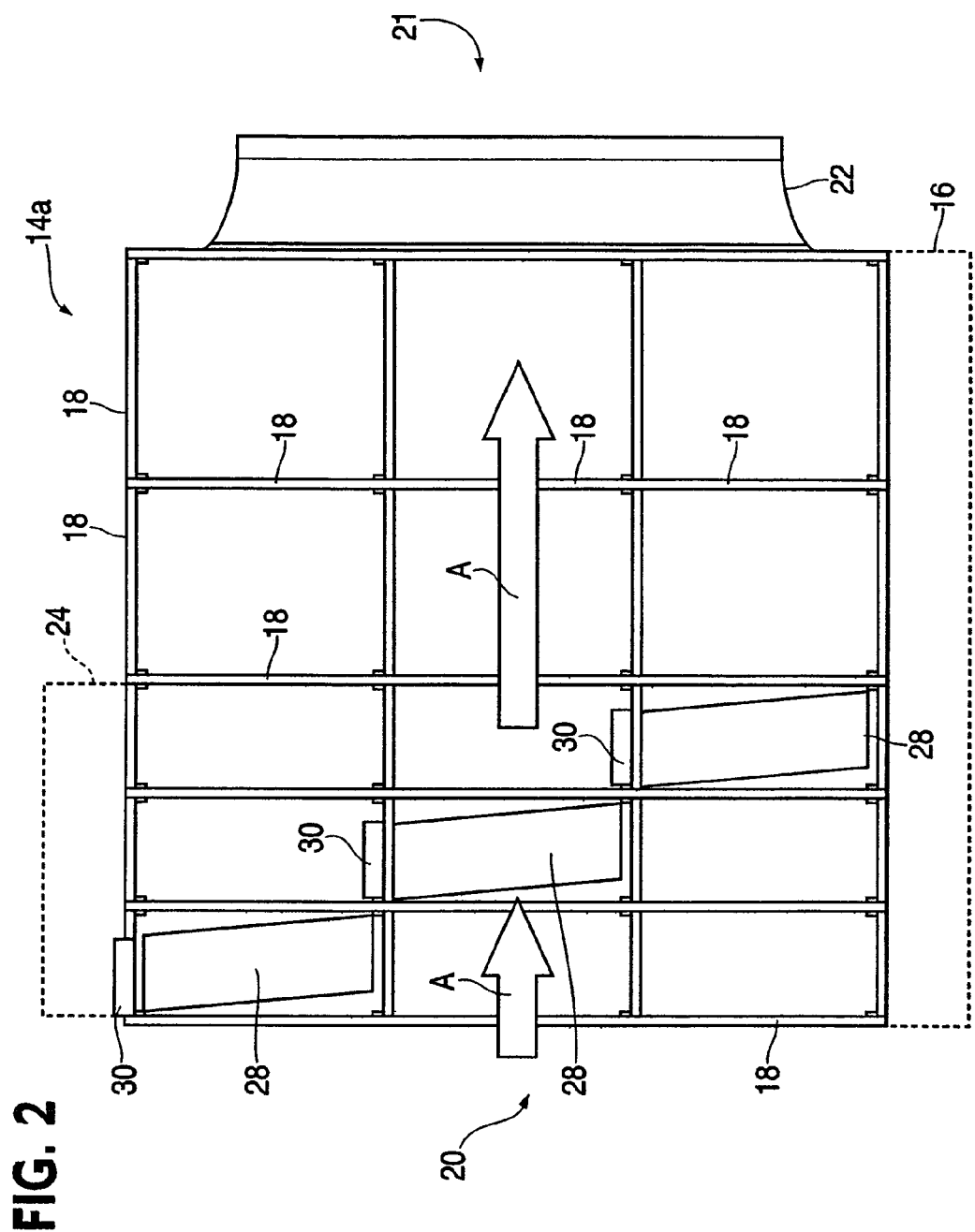
FIG. 2 is a cross-sectional view of a cross-flow heating tower cell that may be employed in the heating tower illustrated in FIG. 1, in accordance with an embodiment of the present invention.
Figure 3:
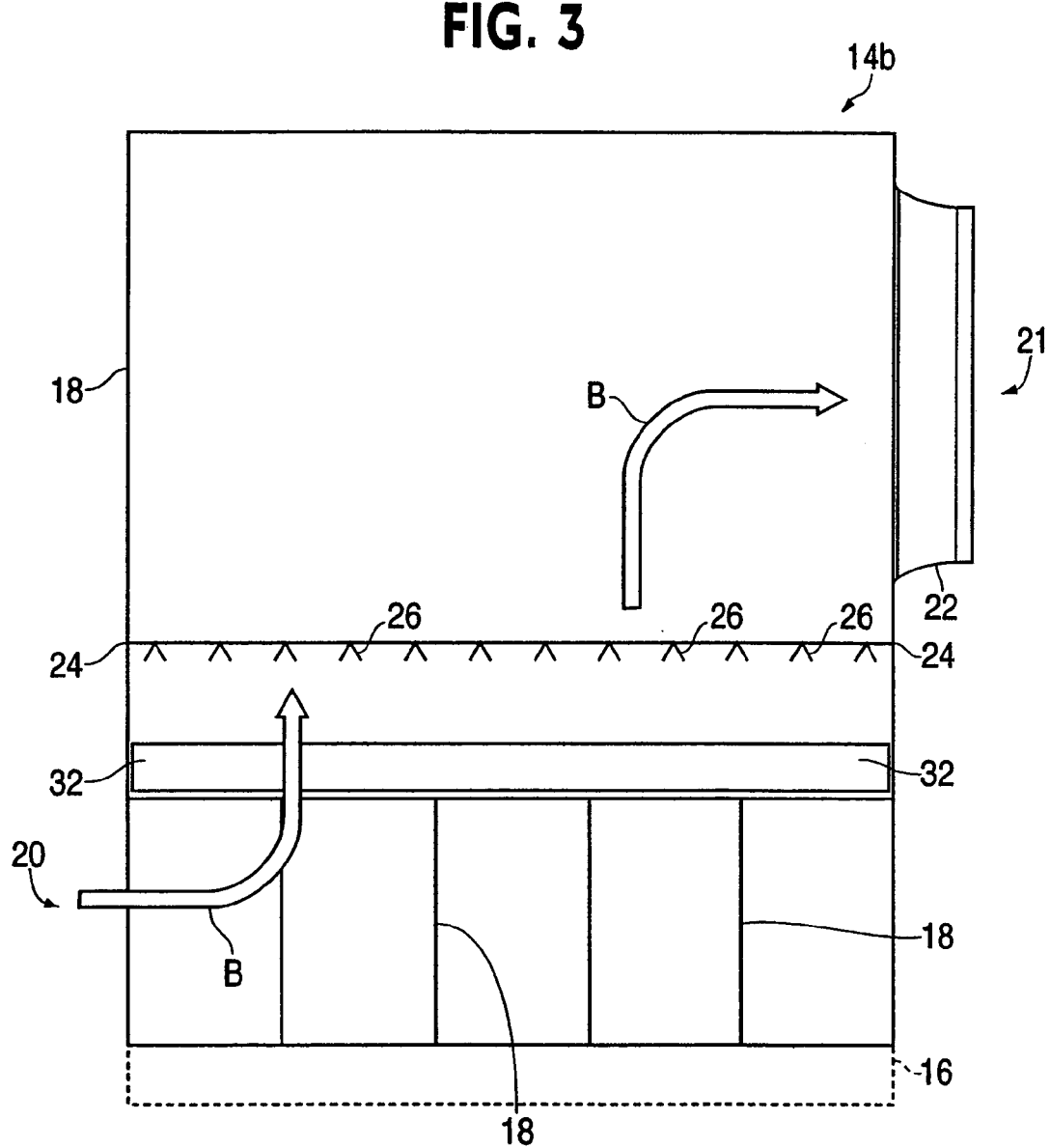
FIG. 3 is a cross-sectional view of a counter flow heating tower cell that may be employed in the heating tower illustrated in FIG. 1, in accordance with another embodiment of the present invention.

Referring now to FIGS. 1-3, a heating tower is depicted, generally designated 10, having an intake shell or duct 12 that defines an air inlet 13. The heating tower 10 also includes a plurality of individual heating tower cells 14 connected to the intake shell 12. FIG. 2 depicts a cross-flow heating tower cell, generally designated 14a while FIG. 3 depicts counter flow heating tower cell, generally designated 14b, both of which will be discussed in further detail below. While FIG. 1 illustrates a heating tower 10 that employs twelve heating tower cells 14 (two are located directly behind the hyperbolic shell and not pictured), the heating tower 10 may employ a varying number of heating tower cells 14, which can generally vary the heating capacity of the heating tower 10. Similarly, the heating tower 10 may employ entirely all cross-flow heating tower cells 14a, entirely all counter flow heating tower cells 14b, or any combination to the two types of heating tower cells 14.

As depicted in FIG. 1, the air intake shell 12 is preferably hyperbolic in shape; however, intake shells of varying geometries may be employed. The hyperbolic shaped air intake shell 12 provides a light weight, strong intake duct that defines the heating tower air intake 13 and isolates the air inlet from the heating tower air outlet, which will be discussed in greater detail below.

Referring now to FIG. 2, a cross-flow heating tower cell 14a is schematically depicted, which may be employed in the heating tower 10. The heating tower cell 14a is a mechanical draft heating tower cell 14a that includes a water basin 16 and a frame assembly or structure 18 to which the water basin 16 is connected. The frame assembly 18 includes an air inlet, generally designated 20, which is located above the water basin 16 and an outlet 21. The cross-flow heating tower cell 14a also includes a fan stack or shroud 22 connected to the frame assembly 18 that has an air generator or fan blade assembly disposed therein. The fan blade assembly is rotated by a gear structure, which in turn is driven by a motor.

As illustrated in FIG. 2, the cross-flow heating tower cell 14a also includes a water distribution assembly 24 that is schematically depicted. The cross-flow heating tower cell 14a also includes a fill assembly, generally designated 28, that is oriented in a position that opposes the shroud 22 and fan assembly. The fill assembly 28 directly underlies the water distribution assembly 24 and extends along the entire air inlet of the cross-flow heating tower cell 14a. The fill assembly 28 is made of up of a number of cross-flow film fill packs and each fill pack comprises a plurality of individual cross-flow film fill sheets connected to one another. The film fill packs can be various sizes and dimensions depending upon the size and dimensions of the cross-flow heating tower cell 14a in which they are employed. The film fill packs that make up the fill assembly 28 are supported in the cross-flow heating tower cell 14a by a water distribution basin structure 30. In one preferred embodiment, the individual sheets that make up the fill packs can hang from wire loops, which wrap around fill support tubes that run transversely to the sheets. The wire loops then may be attached to the supporting structure such as the basin structure 30.

Referring now to FIG. 3, a counter flow heating tower cell 14b is schematically depicted, which may be employed in the heating tower 10. Like the cross-flow heating tower cell 14a depicted in FIG. 2, the counter flow heating tower cell 14b is a mechanical draft heating tower cell 14b that includes a water basin 16 and a frame assembly or structure 18 to which the water basin 16 is connected. The frame assembly 18 includes an air inlet, generally designated 20, which is located above the water basin 16 along with an air flow outlet 21. The counter flow heating tower cell 14b also includes a fan stack or shroud 22 connected to the frame assembly 18, that has an air generator or fan blade assembly 23 disposed therein. The fan blade assembly is rotated by a gear structure, which in turn is driven by a motor.

As illustrated in FIG. 3, the counter flow heating tower cell 14b also includes a water distribution assembly 24 having a plurality of spray nozzles 26. The counter flow heating tower cell 14b also includes a fill assembly, generally designated 32, however, as the name of the counter flow heating tower cell 14b suggests, the fill assembly 32 is a counter flow fill assembly 32. The fill assembly 32 directly underlies the water distribution assembly 24 like its counterpart in the cross-flow fill assembly 28, however unlike its counterpart, it extends along the entire horizontal area of the frame assembly 18, directly above the air inlet 20. The fill assembly 32 is made of up of a number of counter flow film fill packs and each fill pack comprises a plurality of individual counter flow film fill sheets connected to one another. The film fill packs can be various sizes and dimensions depending upon the size and dimensions of the counter flow heating tower cell 14b in which they are employed. The film fill packs that make up the fill assembly 32 are also supported in the counter flow heating tower cell 14b by a plurality of horizontally disposed and spaced cross-members (not pictured).

Referring now to FIGS. 1-3, during operation of the heating tower 10, water is delivered to the water distribution assembly 24 and the distribution assembly proceeds to the deliver or spray the water onto the fill assemblies 28, 32. While water is sprayed onto the fill assemblies, air is simultaneously pulled through the heating tower cells 14a, 14b by their respective fan assemblies. The air initially enters the heating tower 10 via the air inlet 13 of the of the intake shell 12 where it then proceeds to the individual air flow inlets of the individual heating tower cells 14a, 14b.

As illustrated in FIG. 2, as the air flow enters the cross-flow heating tower cell 14a through the inlet 20, it proceeds to flow along a path A, where it contacts and flows through the fill assembly 28. As a result of this contact with the fill assembly, the heat exchange occurs and the air becomes very cool and moist. The cold moist air or effluent, then proceeds to exit the cross-flow heating tower cell 12a through the air flow outlet 21. Similarly, as illustrated in FIG. 3, the air flow enters the counter flow heating tower cell 14b through the inlet 20, beneath the fill assembly 32, and proceeds to flow along a path B, where it contacts and flows through the fill assembly 32, where heat exchange occurs and the air becomes very cool and moist. The cold moist air or effluent then exits the counter flow heating tower cell 14b through the air flow outlet 21. However, as illustrated in FIGS. 2 and 3, the flow path is such in the cross-flow cell 12a that air flows through the cross-flow cell 14a along path A, such that it contacts the fill assembly 28 and water in a perpendicular or normal relationship whereas the air flows through the counter flow cell 14b along path B such that it, contacts the fill assembly 32 in a concurrent relationship.

During operation of the heating tower 10 as described above, the intake shell 12 is positioned with respect to the heating tower cells 14 such that the intake shell 12 functions to isolate the flow of air into the inlet 13 from the outlet flow of effluent exiting the respective outlets 21 of the heating tower cells 14. This positioning or orientation of the intake shell 12 with respect to the heating tower cells 14 reduces the occurrence of recirculation. More specifically this orientation reduces the occurrence of the heating tower effluent from exiting the cells 14 and re-entering the heating tower 10 through the inlet 13.

The cross-flow heating tower cell 14a and counter flow heating tower cell 14b depicted in FIGS. 2 and 3, respectively, may alternatively be utilized in heating tower arrangements that do not utilize an intake shell or the like. For example, in these arrangements such as the one depicted in FIG. 10, the individual cells 14 may be placed in groupings where the cells 14 are spaced apart a distance D of at least one cell width W, preferably two, and the individual cells 14 are preferably elevated off of the ground. In addition, the heating tower cells 14 may be employed singularly, wherein the single cell defines a heating tower, for example a single cell cross-flow heating tower or a single cell counter flow heating tower.

Figure 4:
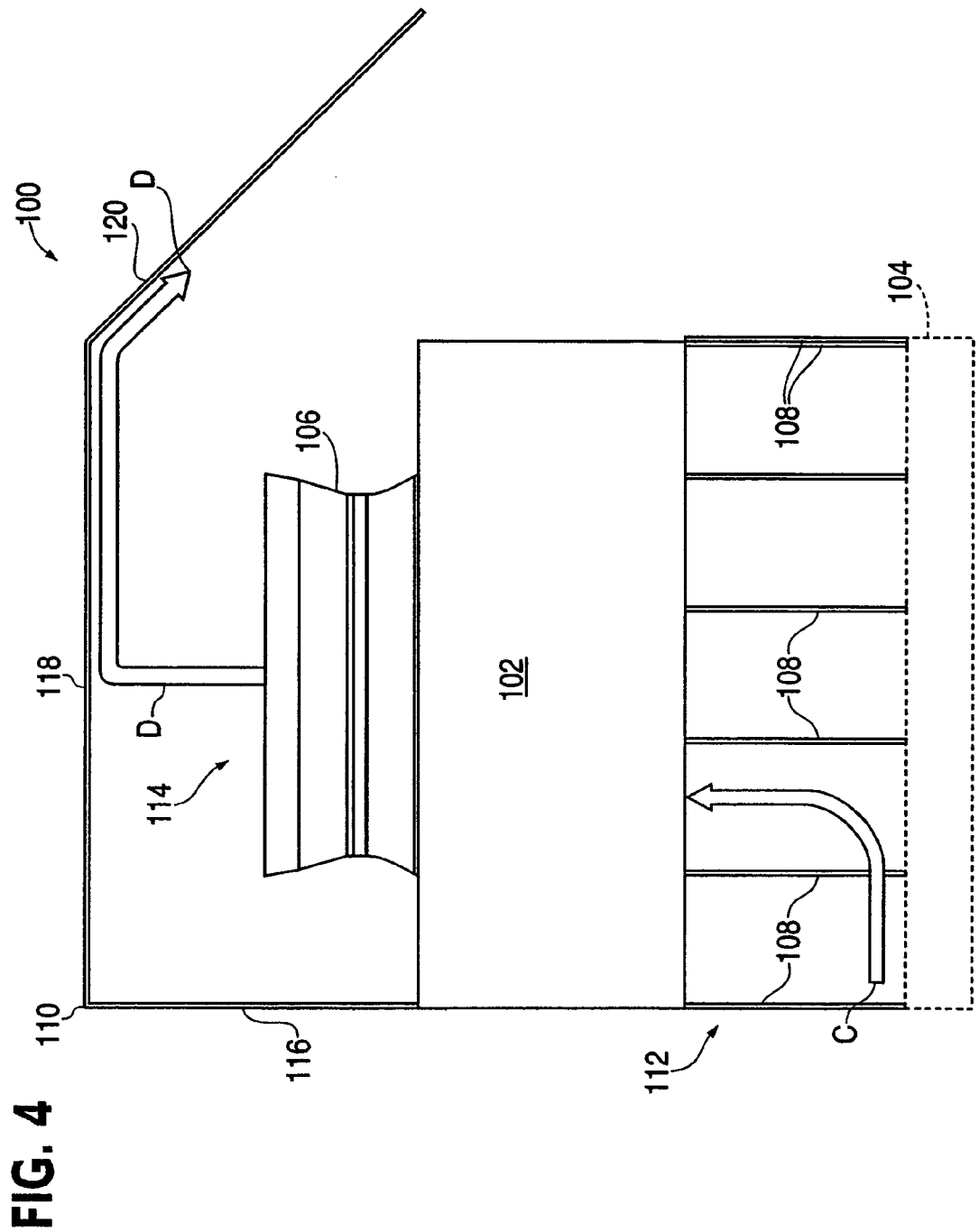
FIG. 4 is a schematic side view of a heating tower cell in accordance with another embodiment of the present invention.

Referring now to FIG. 4, a heating tower cell, generally designated 100, is depicted in accordance with another embodiment of the present invention. The heating tower cell 100 is a mechanical draft heating tower that includes a wet section 102, a water collection basin 104 a shroud or fan stack 106, a frame or frame assembly 108 and an upper housing 110 or canopy that extends above the fan stack 106. The heating tower cell 100 has an air flow inlet 112 and an air flow outlet 114.

The fan stack 106 includes a blade assembly disposed therein that is driven by a motor, while the wet section 102, includes liquid distributors along with a fill assembly, similar to the previous embodiments. The fill assembly includes a number of film fill packs that are made up of individual film fill sheets. Depending upon the heating tower cell 100 application, the heating tower cell 100 can either function in a cross-flow or counter flow capacity, which is dependent upon the type of film fill sheets utilized in the fill assembly of the wet section 102. Counterflow is shown because of the air inlet.

As illustrated in FIG. 4, the upper housing 110 has a first wall 116 that extends upwardly away from the wet section 102. The upper housing 110 also includes a second wall 118 connected to the first wall 114, that extends horizontally across the heating tower cell 100, above the fan stack 106. The upper housing 110 further includes a third, angled wall, or eave 120, connected to the second wall 118, that extends at an angle downwardly and away from the heating tower cell 100 a distance below the fan stack 106.

During operation of the heating tower cell 100, water is delivered to the wet section 102 where the spray nozzles proceed to spray the water onto the fill assemblies. While water is sprayed onto the fill assemblies, air is simultaneously pulled through the heating tower cell 100 by the fan assembly. The air initially enters the heating tower cell 100 via the air inlet 112 and proceeds to flow along an initial path C, where it flows through the wet section 102 and contacts the fill assembly. As the air passes through the fill assembly of the wet section 102, heat exchange occurs and the air becomes very cool and moist. The cold moist air or effluent, then proceeds to exit the heating tower cell 100 through the fan stack 106. Once the effluent exits the heating tower cell 100, the upper housing 110 directs the flow of effluent downward and outward, away from the heating tower cell 100 as indicated by the arrow D.

During the aforementioned operation of the heating tower cell 100 as described above, the upper housing 110 functions to isolate the flow of effluent from the flow of air entering the inlet 112. Once the effluent exits the heating tower cell via the fan stack 106, the air contacts the walls 116, 118, 120 of upper housing which force the effluent in a direction opposite the inlet 112, as indicated by the arrow D, reducing the likelihood of recirculation occurring. More specifically, the use of the upper housing 110 and, the action of its walls 116, 118, 120, reduces the occurrence of the heating tower effluent from exiting the heating tower cell 100 and reentering the cell 100 through the inlet 112. Upper housing wall configuration is not limited to that shown, but, for example, walls 116 and 118 could be replaced by three or more straight wall segments that provide more of a curvature approximation. Furthermore, the upper housing 110 may be curvilinear.

Like the embodiments described previously, the heating tower cell illustrated in FIG. 4 may also be used in combination with an intake shell that extends from the inlet 112. Also, the heating tower cell 100 may be used in combination with multiple similar heating tower cells to form a large multi-cell heating tower, such as with a hyperbolic shell similar to FIG. 1.

Figure 5:
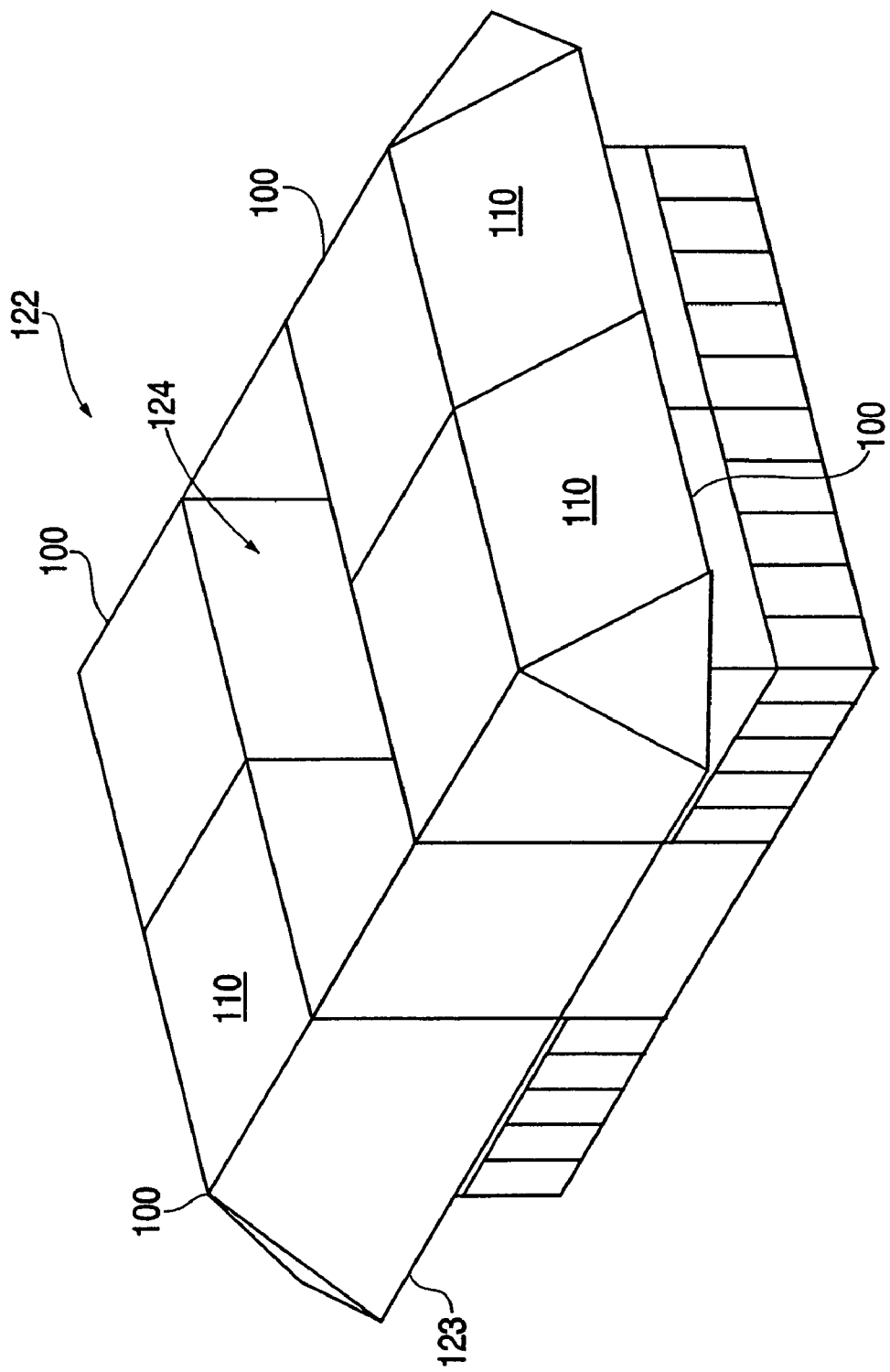
FIG. 5 is a top perspective view of a heating tower in accordance with the embodiment of FIG. 4.

FIG. 5 depicts a multi-cell heating tower, generally designated 122, that employs four heating tower cells 100, each similar to that illustrated in FIG. 4. Each of the cells 100 has an upper housing 110 that combines to form a roof or canopy 123 over all the fan stacks of the respective heating tower cells 100. In the embodiment depicted, the heating tower cells 100 have a common inlet 124 where air enters the heating tower 122. The common inlet 124 functions like an air inlet shell, similar to that depicted on the embodiment illustrated in FIG. 1. The common inlet 124 combines with the roof or canopy 123 to reduce the occurrence of the heating tower effluent from exiting the heating tower cells 100 and re-entering the heating tower 122 through the air inlet 124.

Figure 6:
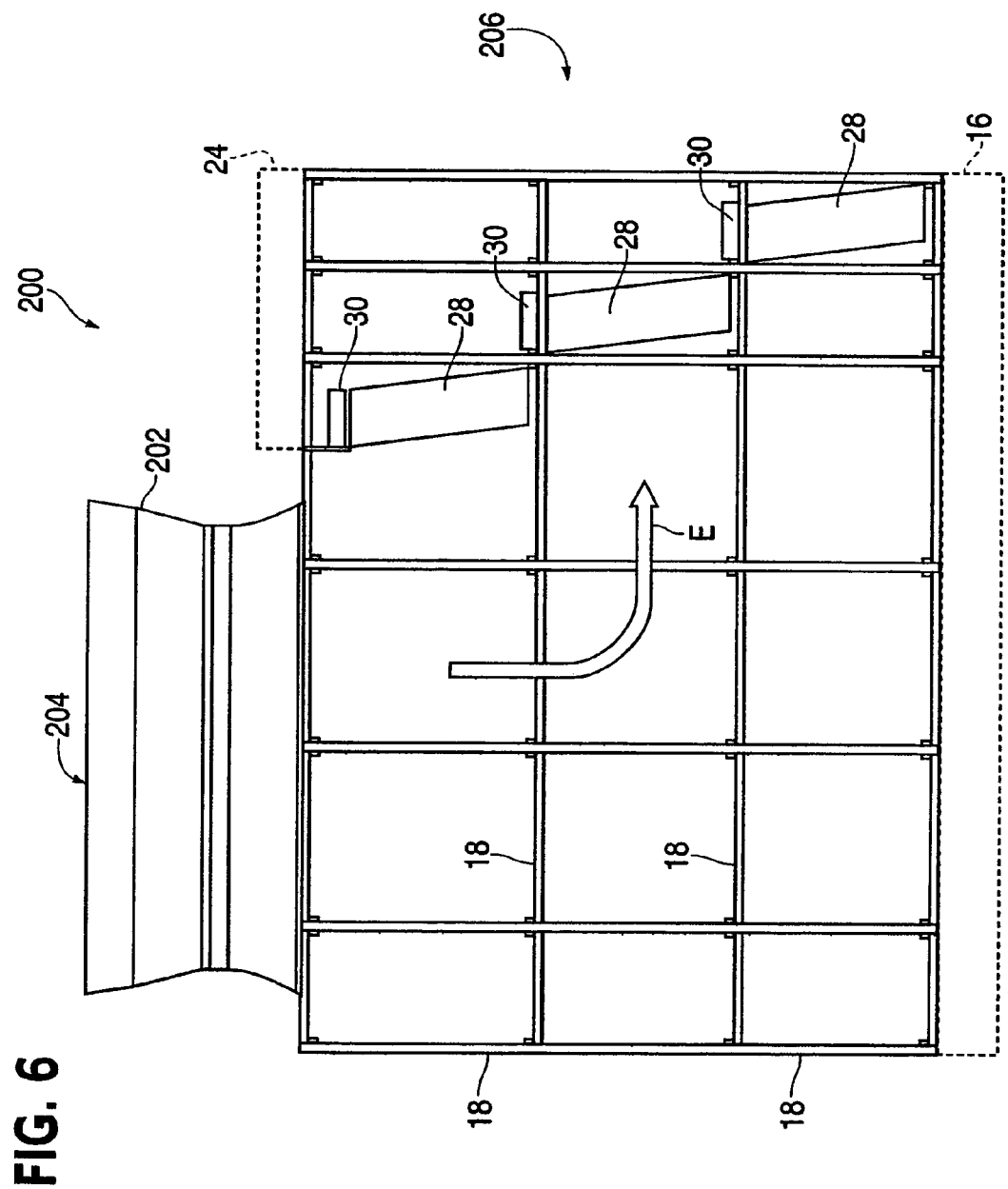
FIG. 6 is a schematic side view of a heating tower in accordance with yet another embodiment of the present invention.

Referring now to FIG. 6, a cross-flow heating tower cell 200 is depicted, in accordance with an alternative embodiment of the present invention. The heating tower cell 200 is a mechanical draft heating tower cell 200, similar to the previous embodiments described, that includes a water basin 16 and a frame assembly or structure 18 to which the water basin 16 is connected. The heating tower cell 200 is preferably elevated or raised off of the ground like the previous embodiments, however this elevation is not necessarily required for proper operation. The cross-flow heating tower cell 200 also includes a fan stack or shroud 202 connected to the frame assembly 18 that defines an air inlet 204. The fan stack 202 has an air generator or fan blade assembly disposed therein. The fan blade assembly is rotated by a gear structure, which in turn is driven by a motor.

As illustrated in FIG. 6, the cross-flow heating tower cell 200 also includes a water distribution assembly 24 along with an air flow outlet, generally designated 206. The cross-flow heating tower cell 200 also includes a fill assembly, generally designated 28, that directly underlies the water distribution assembly 24 and extends across the entire outlet 206 of the cross-flow heating tower cell 200. The fill assembly 28 is made of up of a number of cross-flow film fill packs and each fill pack comprises a plurality of individual cross-flow film fill sheets connected to one another. The film fill packs can be various sizes and dimensions depending upon the size and dimensions of the cross-flow heating tower cell 200 in which they are employed. The film fill packs that make up the fill assembly 28 are supported in the cross-flow heating tower cell 200 by wire loops or the like, which wrap around fill support tubes that run transversely to the individual sheets of the packs. The wire loops then may be attached to the supporting structure such as the basin structure 30.

During operation of the cross-flow heating tower cell 200, water is delivered or sprayed onto the fill assembly 28 via the water distribution assembly 24. While water is sprayed onto the fill assembly 28, air is simultaneously pulled through the cross-flow heating tower cell 200 by the fan assembly. The air initially enters the heating tower 200 via the air inlet 204, where it then proceeds to contact the fill assembly 28.

As illustrated in FIG. 6, as the air flow enters the cross-flow heating tower cell 200 through the inlet 204 and it proceeds to flow along a path E, where it contacts the fill assembly 28 in a perpendicular or normal relationship, and flows through the wet fill assembly 28 causing heat exchange to occur. Again, due to this contact the air becomes very cool and moist. The cold, moist air or effluent, then proceeds to exit the cross-flow heating tower cell 200 through the air flow outlet 206.

During operation of the cross-flow heating tower cell 200 as described above, the fan stack or shroud 202 functions to isolate the flow of air into the inlet 204, from the outlet flow of effluent exiting the outlet 206. This positioning or orientation of the fan stack 202 in relation to the outlet 206, reduces the occurrence of recirculation. More specifically, this orientation reduces the occurrence of the heating tower effluent from exiting the cell 200 and re-entering the cell through the inlet 204.

Figure 7:
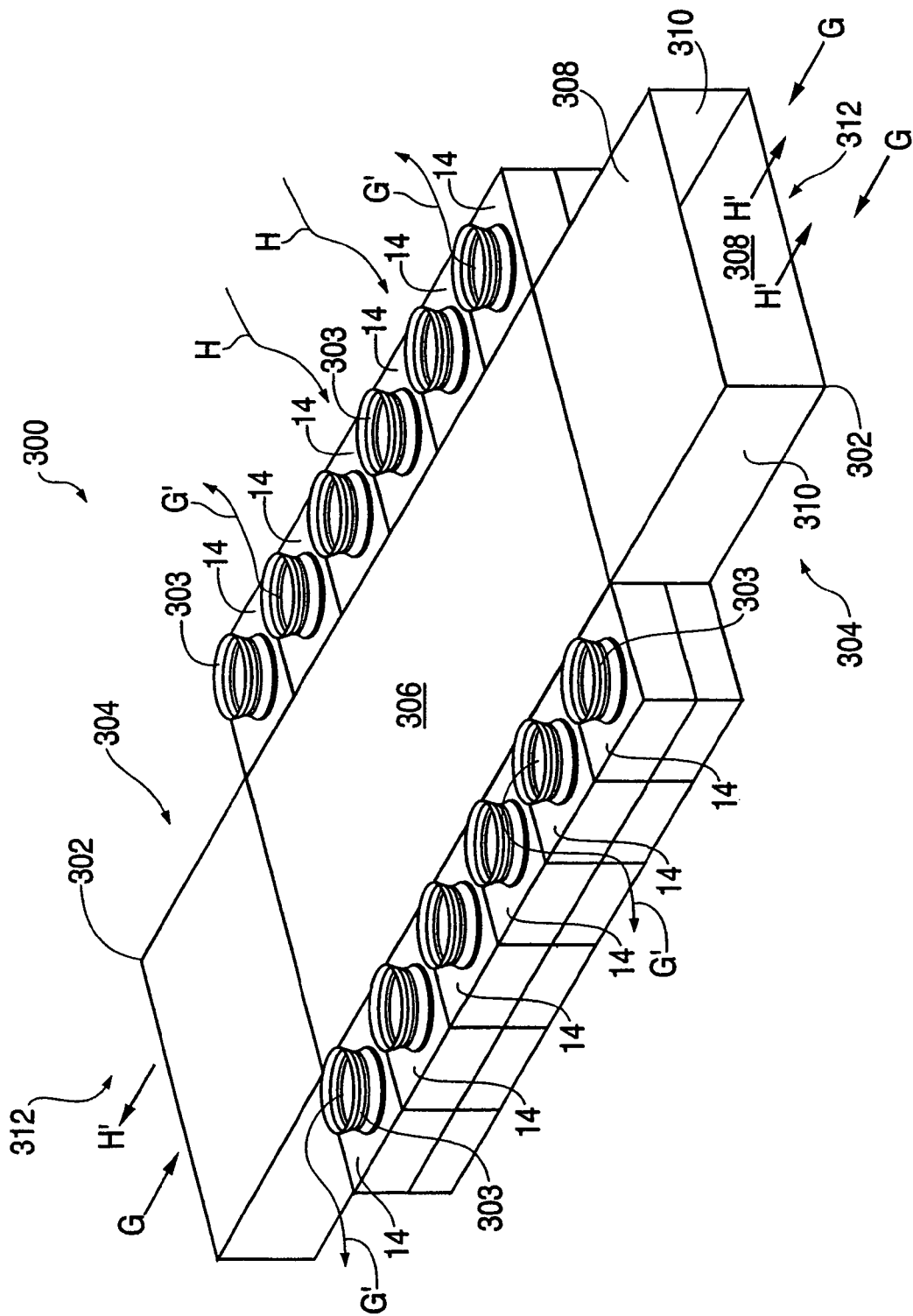
FIG. 7 is top perspective view of a heating tower cell in accordance with still another embodiment of the present invention.

Referring now to FIG. 7, a heating tower, generally designated 300, is illustrated in accordance with another embodiment of the present invention. As depicted in FIG. 7, the heating tower includes an air inlet duct 302 through which the heating tower effluent travels as the air enters the heating tower 300. Similar to the embodiment depicted illustrated in FIGS. 1-3, the heating tower 300 includes a plurality of individual heating tower cells 14 that are connect to the air inlet duct 302, and to one another, in an opposed, series relationship. Like the embodiments discussed previously in FIGS. 1-3, the heating tower cells 14 utilized in the tower 300 are each mechanical draft heating tower cells 14 having a fan stack our shroud 303 having a fan assembly disposed therein. The fan stacks 303 of each of the heating tower cells 14 combine to define the air flow outlet(s) of the heating tower 300. Also, the heating tower cells 14 may be either a cross-flow design, similar to that depicted in FIG. 2, or a counter flow design, similar to that depicted in FIG. 3.

While FIG. 7 illustrates a heating tower 300 that employs twelve heating tower cells 14, the heating tower 300 may employ a varying number of heating tower cells 14, enabling the end user to adjust the heating capacity of the heating tower 300. Similarly, the heating tower 300 may employ entirely all cross-flow heating tower cells 14, entirely all counter flow heating tower cells 14, or any combination to the two types of heating tower cells 14.

As depicted in FIG. 7, the air inlet duct 302 is preferably rectangular in shape, having two end sections 304 and a middle section 306. Each of the sections include opposing top and bottom walls connected to two opposing side walls 310. Though an air inlet duct 302 having a generally rectangular geometry is depicted, inlet ducts 302 of varying geometries may be employed. In the illustrated embodiment, the air inlet duct defines a dual, air flow inlet 312 for the heating tower 300 which and functions to isolate the air inlet 312 from the heating tower air outlets of the individual heating tower cells 14.

During operation of the heating tower 300, air is pulled into the heating tower 300 through the heating tower cells viaducts 302 as indicated by arrows G. The air proceeds to flow into the wets sections of the respective heating tower cells 14, where the heat exchange occurs, similar to the embodiments depicted in FIGS. 1-6. As the air flows through the wet sections, it imparts its heat upon the falling liquid and the air temperature significantly becomes cooler. The cold air or effluent then proceeds to exit each of the individual heating tower cells 14 through the stack 303 of the individual cells 14, as indicated by arrow G'.

During the aforementioned operation of the heating tower 300, the air flow inlet duct 302 functions to isolate the inlet airflow entering the individual heating tower cells from the effluent air being discharged from the stacks 303, reducing the likelihood of recirculation occurring.

Alternatively, the heating tower depicted in FIG. 7, and the individual cells 14, may be reconfigured so that the air inlet duct 302 functions as an outlet duct through which the heating tower effluent travels as the effluent exits the heating tower 300. Similar to the embodiment depicted illustrated in FIGS. 1-3, the heating tower 300 includes a plurality of individual heating tower cells 14 that are connected to the air outlet duct 302, and to one another, in an opposed, series relationship. Like the embodiments previously discussed, the heating tower cells 14 utilized in the tower 300 are each mechanical draft heating tower cells 14 having a fan stack our shroud 303 having a fan assembly disposed therein. In this reconfigured embodiment, however, the fan stacks 303 of each of the heating tower cells 14 now combine to define the air flow inlet(s) of the heating tower 300 instead of the outlet.

During operation of the heating tower 300 with that alternative configuration, as previously described, air is pulled into the heating tower 300 through the heating tower cells via each of the fan stacks 303 as indicated by the arrows H. The air proceeds to flow into the wet sections of the respective heating tower cells 14, where the heat exchange occurs, similar to the embodiments depicted in FIGS. 1-6. As the air flows through the wet sections, it imparts its heat upon the falling liquid and the air temperature significantly becomes cooler and accumulates the moisture. The cold air or effluent then proceeds to exit each of the individual heating tower cells 14 where it enters the air flow outlet duct 302, as indicated by arrows H'.

Figure 8:
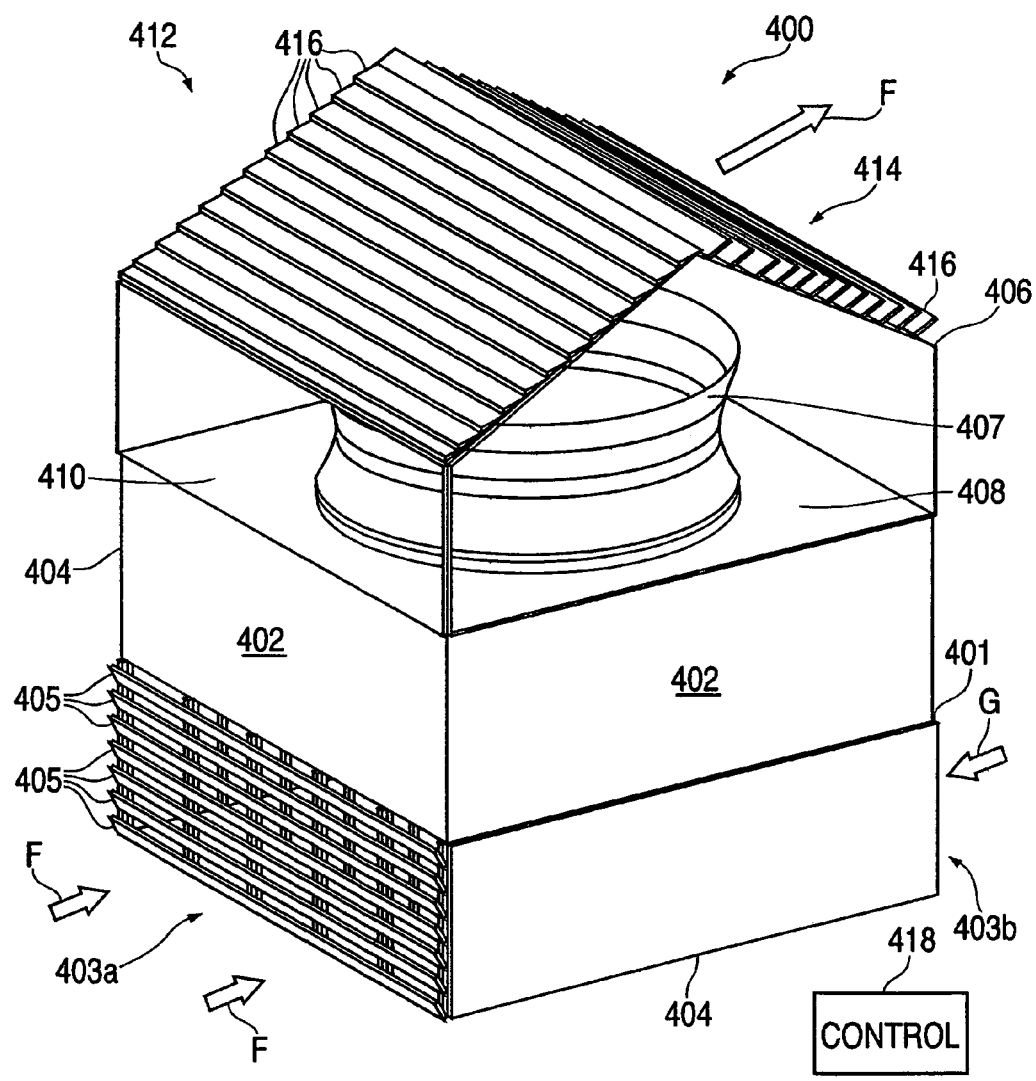
FIG. 8 is partial cut-away, side perspective view of a heating tower cell in accordance with another embodiment of the present invention.

Referring now to FIG. 8, a heating tower cell, generally designated 400, is illustrated in accordance with another embodiment of the present invention. The heating tower cell 400 is similar to the previous embodiments depicted in FIGS. 1-7. The heating tower cell 400 can be oriented to perform in a cross-flow heating tower arrangement or configuration, similar to that illustrated in FIGS. 2 and 6, or the heating tower cell 400 can be oriented to perform in a cross-flow heating tower arrangement or configuration, similar to that illustrated in FIG. 3. However, whereas the embodiment depicted in FIG. 3 employs a side stack, the embodiment depicted in FIG. 8 employs a vertical stack.

Like the embodiments previously described in connection with FIGS. 1-7, the heating tower cell 400 is a mechanical draft tower cell 400 that includes a water basin (not pictured) and a lower housing 401. The lower housing 401 includes a wet section 402 along with the water basin and is composed of four sides 404. The heating tower cell 400 also includes a first air inlet 403a and a second air inlet 403b which opposes the first air inlet 403a. Each the air inlets 403a, 403b have a plurality of inlet doors or louvers 405, which function to control the flow of air through the inlets 403a, 403b, as desired during heating tower cell 400 operation. The heating tower cell 400 also includes a shroud or fan stack 407 mounted on top of the lower housing 401 that has an air generator or fan blade assembly disposed therein. The fan blade assembly is rotated by a gear structure, which in turn is driven by a motor.

The wet section 402, like those of the previously discussed embodiments, includes liquid distributors along with a fill assembly, both of which are not pictured for the purposes of clarity. The fill assembly includes a number of film fill packs that are made up of individual film fill sheets. Depending upon the heating tower cell 400 application, the heating tower cell can either be fitted with counter flow film fill sheets or cross-flow film fill sheets, and therefore the cell may either function as a counter flow cell in counter flow tower or a cross-flow cell in a cross-flow tower.

As illustrated in FIG. 8, the heating tower cell 400 also includes an upper housing or outlet housing 406 that is mounted to or connected to the lower housing 401. The outlet housing 406 includes two opposing end walls 408 extending upwardly from the lower housing 401 which are connected to two opposing side walls 410, which also extend upwardly from the lower housing 401. The outlet housing 406 also includes a first air outlet 412, positioned in a downward sloping orientation and a second air outlet 414, positioned opposite the first air outlet 412, in a downward sloping orientation. Each of the air outlets 412, 414 include a series of louvers or doors 416 that extend horizontally between the end walls 408 of the outlet housing 406 that function to control the flow of air or effluent out of the respective outlets 412, 414.

In the embodiment illustrated in FIG. 8, the air flow inlets 403a, 403b of the heating tower cell 400 are illustrated on opposing side walls only, however, the heating tower cell 400 may have multiple air inlets 403, similar to the ones depicted, on all four sides 404 of the lower housing 401. Each of the multiple air inlets also include inlet louvers or doors 404 that extend horizontally along the entire length of the walls. Similarly, the air outlets 414 do not have to be positioned on opposing sides, in a downward sloping orientation. Alternatively, the upper housing 406 may have a generally square or rectangular geometry, similar to the lower housing 401, having multiple air outlets 414, similar to that depicted, each located or extending along the four sides 408, 410 of the upper housing 406. Each of the multiple air outlets 412, 414 also include outlet louvers or doors 406 that extend horizontally along the entire length of the outlets.

During operation of the heating cell 400, water is delivered to the wet section 402 where nozzles proceed to distribute the water onto the fill assembly whether it be cross-flow or counter flow. While water is distributed onto the fill assembly, air is simultaneously pulled through the heating tower cell 400 by the fan assembly. As indicated by the arrows F, the air initially enters the heating tower cell 400 via the air inlet 403a and proceeds to flow into and through the wet section 402, where it contacts the fill assembly. As the air passes through the wet section 402, heat exchange occurs and then becomes very cool and moist. The cool, moist air, or effluent, then proceeds to exit the heating tower cell 400 through the fan stack 407.

As illustrated in FIG. 8, the fan stack 407 is disposed on top of lower housing within the upper housing 406, thus, once the effluent exits the heating tower cell 400, it enters the upper housing 406. In the embodiment depicted, the heating tower cell 400 is configured such that the louvers 416 of the first air outlet 412 are closed, closing the outlet 412, while the louvers or doors 416 of the second air outlet 414 are open. Therefore, upon entering the upper housing 406, the air proceeds to exit the heating tower cell 400 through the second air outlet 414 as indicated by the arrow F.

During operation of the heating tower cell 400, the upper housing 406, in combination with the louvers 416 of the air outlet 414, functions to isolate the flow of effluent from the fan stack 407 from the air entering the inlet 403. Once the effluent exits the heating tower cell 400 via the fan stack 407, the effluent is prevented from exiting the upper housing 406 through the first air outlet 412, because the louvers 416 are closed. The effluent is therefore essentially forced or directed to exit via the second air outlet 414. The effluent therefore exits the heating tower cell 400 on the side opposite the air inlet 403, reducing the likelihood that recirculation will occur. More specifically, the utilization of the second air flow outlet 414 in combination with the first air inlet 403a, reduces the occurrence of the heating tower cell 400 effluent from exiting the heating tower cell 400 and re-entering the cell 400 through the inlet 403a.

Also during operation, the heating tower cell 400 may operate using an alternate configuration then that illustrated in FIG. 8. The heating tower cell 400 may also operate via configuration, wherein the first inlet 403a is closed along with the second outlet 414, and the second air inlet outlet 403b is open along with the first air outlet 412. While in this configuration, air flows in the heating tower cell 400 via the second inlet 403b and though the wet section 402 and out the fan stack 407, as described in connection with the previous embodiment. However, contrary to the configuration depicted in FIG. 8, the effluent exits the fan stack 407 and proceeds to exit the upper housing 406 through the first outlet 412, opposite the second air inlet 403b.

Like the configuration illustrated in FIG. 8, the above-described alternate configuration louvers 416 of the first air outlet 412, functions to isolate the flow of effluent of the heating tower cell 400 from the air entering the second inlet 403b. Once the effluent exits the heating tower cell 400 via the fan stack 407, the effluent is now prevented from exiting the upper housing 406 through the second air outlet 414, because the louvers 416 are closed. The effluent is therefore forced or directed to exit via the first air outlet 412. The effluent therefore exits the heating tower cell 400 on the side opposite the second air inlet 403b, reducing the likelihood that recirculation will occur. More specifically, the closing of the louvers 416 on the second air outlet 414, while opening the louvers 416 on the first air outlet 412, in combination with utilizing the second inlet 403b, reduces the occurrence of the effluent from exiting the heating tower cell 400 and re-entering the cell 400 through the second inlet 403b.

The louvers 405 and 416 of the inlets 403 and outlets 412, 414, respectively, preferably are actuated between the open and closed positions by mechanical actuators. The actuators are operated by a control 418 which allows the heating tower cell 400 operator to select or designate which inlets 403 or outlets 412, 414 to open or close during cell 400 operation, for example in response to atmospheric conditions, such as wind direction. Also, the controller 418 may include a sensing means that senses the atmospheric conditions, or changes in the atmospheric conditions, and automatically changes the configuration of the heating tower cell by opening and closing the air flow inlets and outlets accordingly.

Figure 9:
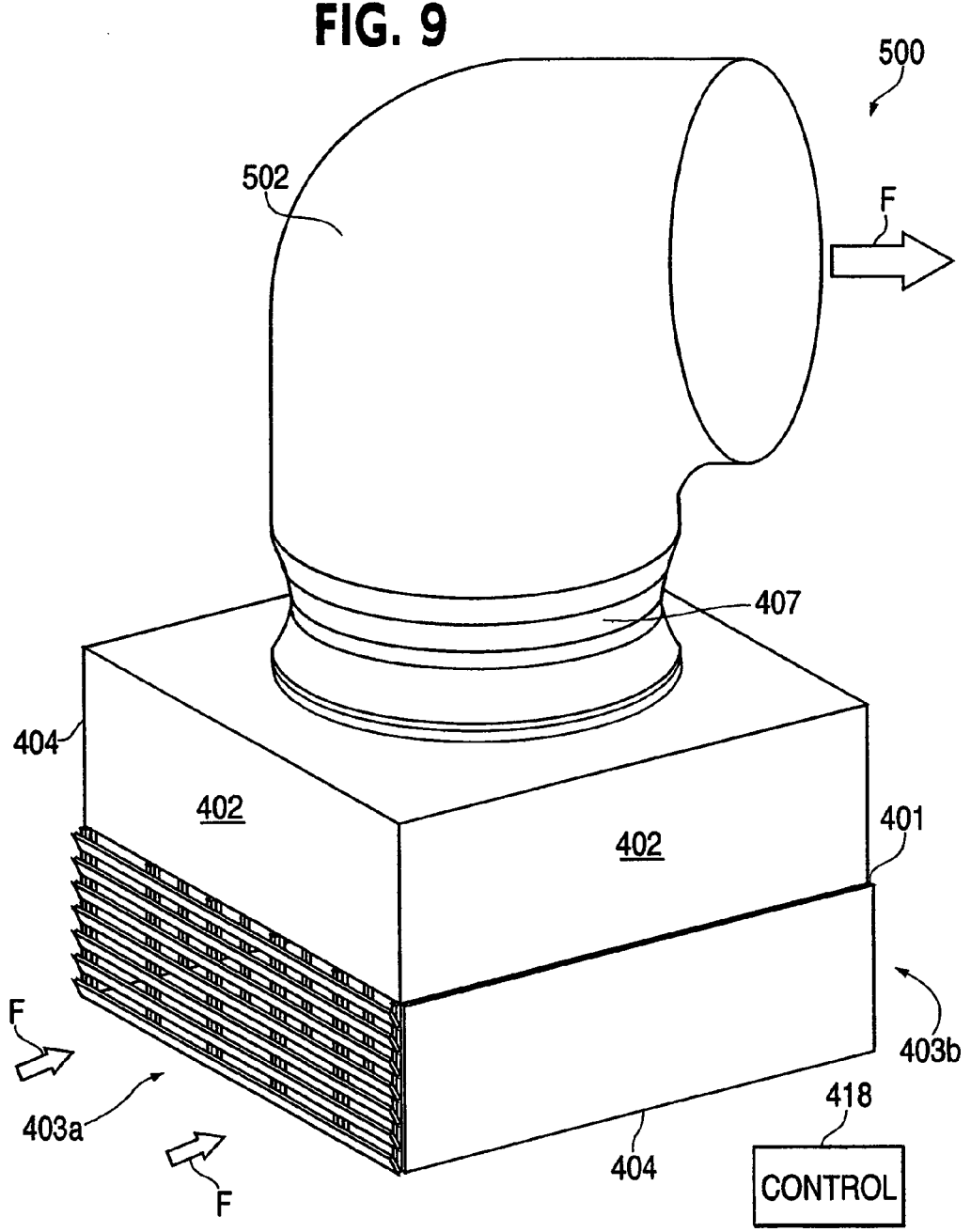
FIG. 9 is a top perspective view of a heating tower cell in accordance with another embodiment of the present invention.

Referring now to FIG. 9, a heating tower cell 500 is illustrated, which is an alternative embodiment of the heating tower cell 400 depicted in FIG. 8. The heating tower cell 500 is similar to that illustrated in FIG. 8, however the heating tower cell 500 depicted in FIG. 9 employs an exhaust duct or port 502 instead of an upper housing 406.

As illustrated in FIG. 9, the exhaust port 502 is connected to the fan stack 407 and provides a pathway for the heating tower effluent to exit, away from the inlet 403a. During the operation of the heating tower cell 500, the effluent exits the heating tower cell 500 via the fan stack 407 and proceeds through the exhaust port 502. The exhaust port 502 acts to direct the effluent along a path outward, away from the heating tower cell 500, as indicated by arrow F. This path reduces the likelihood of recirculation occurring. More specifically, the exhaust duct 502 functions to reduce the occurrence of the heating tower cell effluent from exiting the heating tower cell 500 and re-entering the cell 500 through the inlets 403a and 403b.

The exhaust duct 502 of the heating tower cell 500 is preferably rotated about the fan stack 407 by a mechanical rotation means. Like the actuators in the embodiment depicted in FIG. 8, the mechanical rotation means is operated by the control 418 which allows the heating tower cell 500 operator to select a desired position for the exhaust duct 502 during cell 500 operation, for example in response to atmospheric conditions, such as wind direction. Also, the controller 418 may include a sensing means that senses the atmospheric conditions, or changes in the atmospheric conditions, and automatically rotates the exhaust duct 502 to a predetermined or pre-programmed position.

Figure 10:
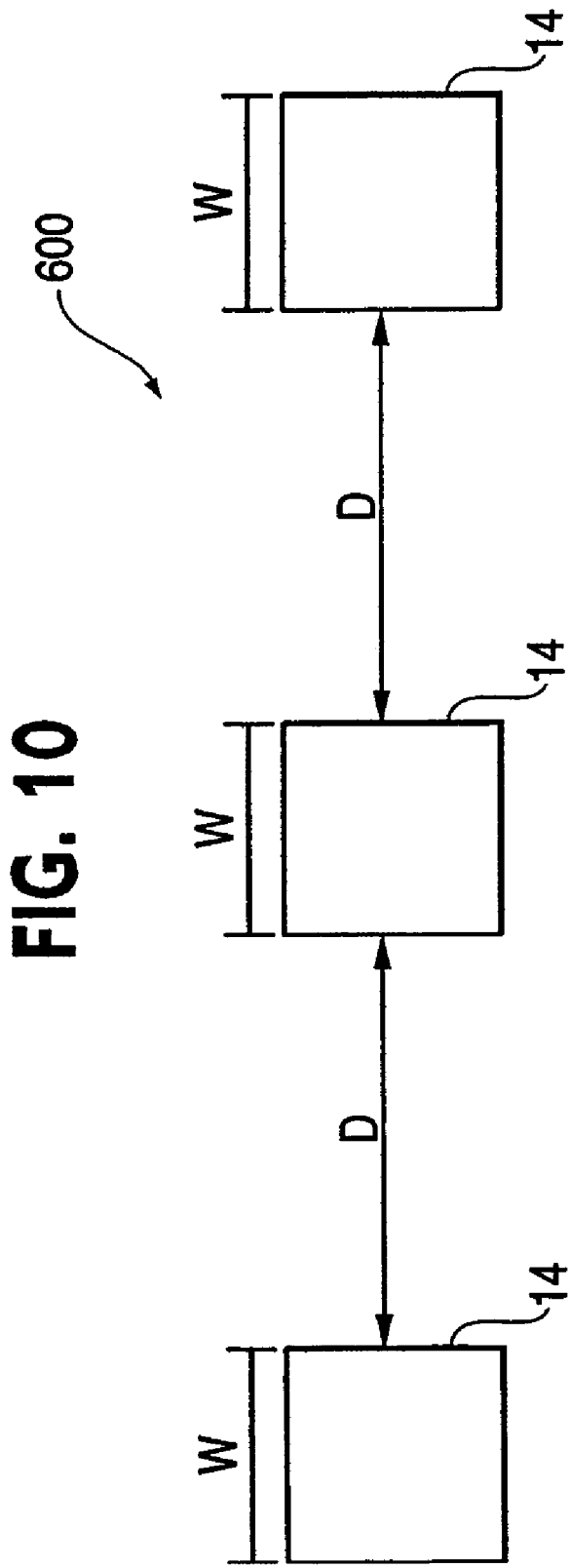
FIG. 10 is a schematic plan view of a heating tower configuration in accordance with another embodiment of the present invention.

Referring now to FIG. 10, a schematic plan view of a heating tower configuration, generally designated 600, is depicted in accordance with an alternative embodiment of the present invention. As illustrated in FIG. 10, the individual heating tower cells 14 of the heating tower configuration 600 each have a width W while they are spaced apart a distance D. In some heating tower configurations, for example, the heating tower cell width W may range from approximately 30' to approximately 60' while in other configurations the width W of the individual cells may range from approximately 50' to approximately 60'. In one preferred embodiment, the distance D between the individual heating tower cells 14 is preferably twice the width W of the heating tower cells 14, or equal to approximately 2W.

Figure 11:
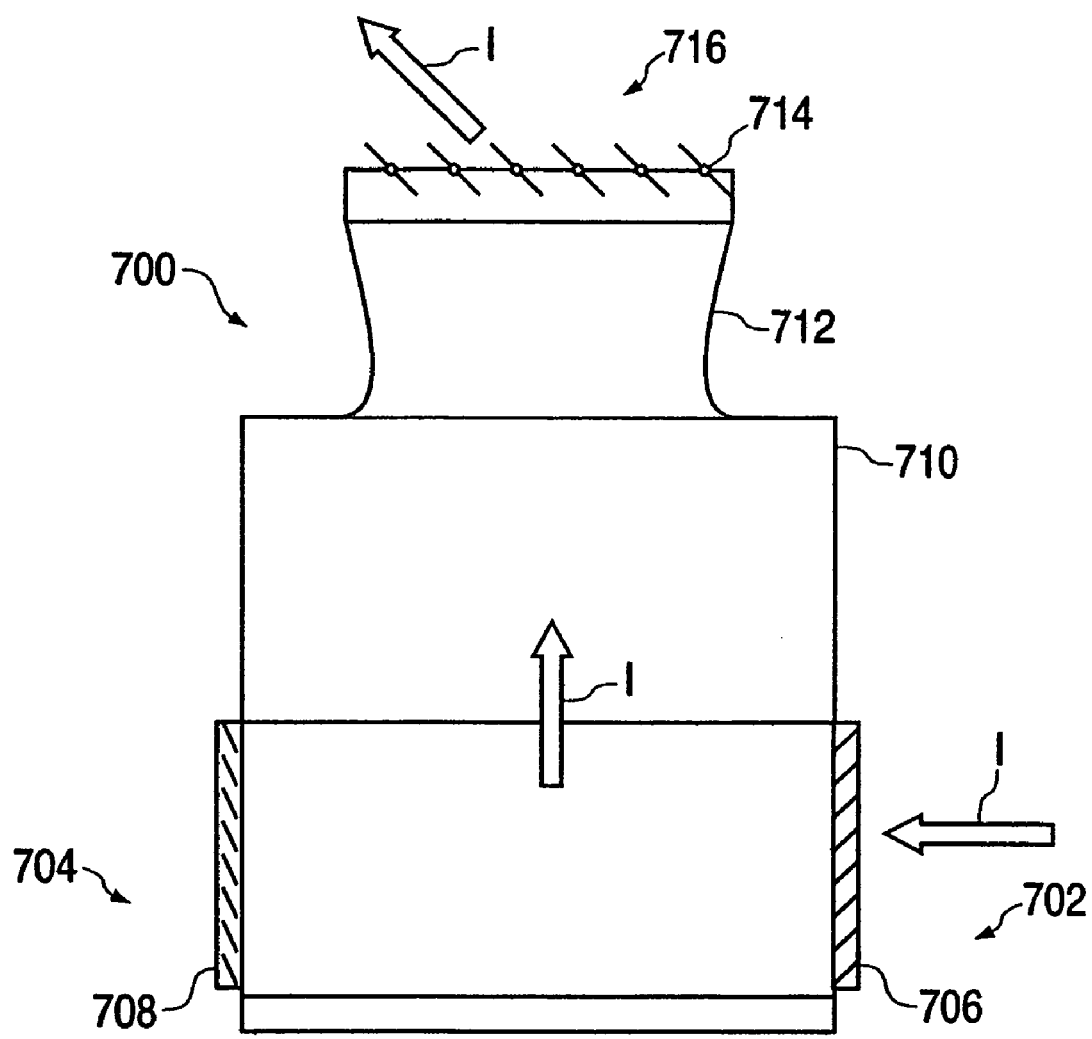
FIG. 11 is a schematic side view of a heating tower in accordance with another embodiment of the present invention.

Referring now to FIG. 11, a side, schematic view of a heating tower is illustrated, generally designated 700. The heating tower 700 is preferably a mechanical draft heating tower having opposing air inlets 702 and 704 along with a first series of blade type damper doors 706 which correspond to the first inlet 702 and a second series of blade type damper doors 708 which correspond to the second inlet 704. While blade type damper doors 706, 708 are illustrated in FIG. 11, the heating tower 700 may alternatively employ damper doors other that the blade type ones depicted, for example roll-up doors. The first series of damper doors 706 function to control inlet air flow through the first inlet 702 while the second series of damper doors 708 function to control inlet air flow through the second inlet 704. The heating tower further includes a wet section 710 located generally above the inlets 702, 704 for counterflow or horizontally adjacent the inlets 702, 704 for crossflow along with a fan stack 712 connected to the wet section 710. As illustrated in FIG. 11, the heating tower 700 also includes a series of rotatable vanes 714 that are connected to the fan stack 712 and extend across the heating tower outlet, generally designated 716.

During operation of the heating tower 700, water is delivered to the wet section 710 similar to that described in connection with the previous embodiments, while air is simultaneously pulled through the heating tower 700 by a fan assembly. In the configuration depicted, the first damper doors 706 are open while the second 708 are closed. Therefore, the air enters the heating tower 700 via the first air inlet 702 and proceeds to flow along the path I, where it flows through the wet section 710 and contacts the fill assembly. As the air passes through the fill assembly of the wet section 710, heat exchange occurs and the air becomes very cool. The cold air or effluent, then proceeds to exit the heating tower 700 through the fan stack 712. As the effluent exits the heating tower 700, the rotatable vanes 714 function to isolate the flow of effluent from the fan stack 712 from the air entering the inlet 702.

As illustrated in FIG. 11, the rotatable vanes direct the effluent to exit the heating tower 700 on the side opposite the air inlet 702, as indicated by the airflow stream I, reducing the likelihood that recirculation will occur. More specifically, the utilization of the rotatable vanes 714 in combination with the first air inlet 702, reduces the occurrence of the heating tower 700 effluent from exiting the heating tower 700 and re-entering the tower 700 through the inlet 702.

Also during operation, the heating tower 700 may operate using an alternate configuration then that illustrated in FIG. 11. The heating tower 700 may also operate via a configuration, wherein the first series of damper doors 706 are closed, while the second series of damper doors 708 are open. In this configuration, the rotatable vanes 714 are rotated in a direction opposite the second inlet 704. While in this configuration, air flows into the heating tower 700 via the second inlet 704 and though the wet section 710 and out the fan stack 712, as described in connection with the previous embodiment. However, contrary to the configuration depicted in FIG. 11, the effluent exits the fan stack 712 opposite the second air inlet 704.

Figure 12:
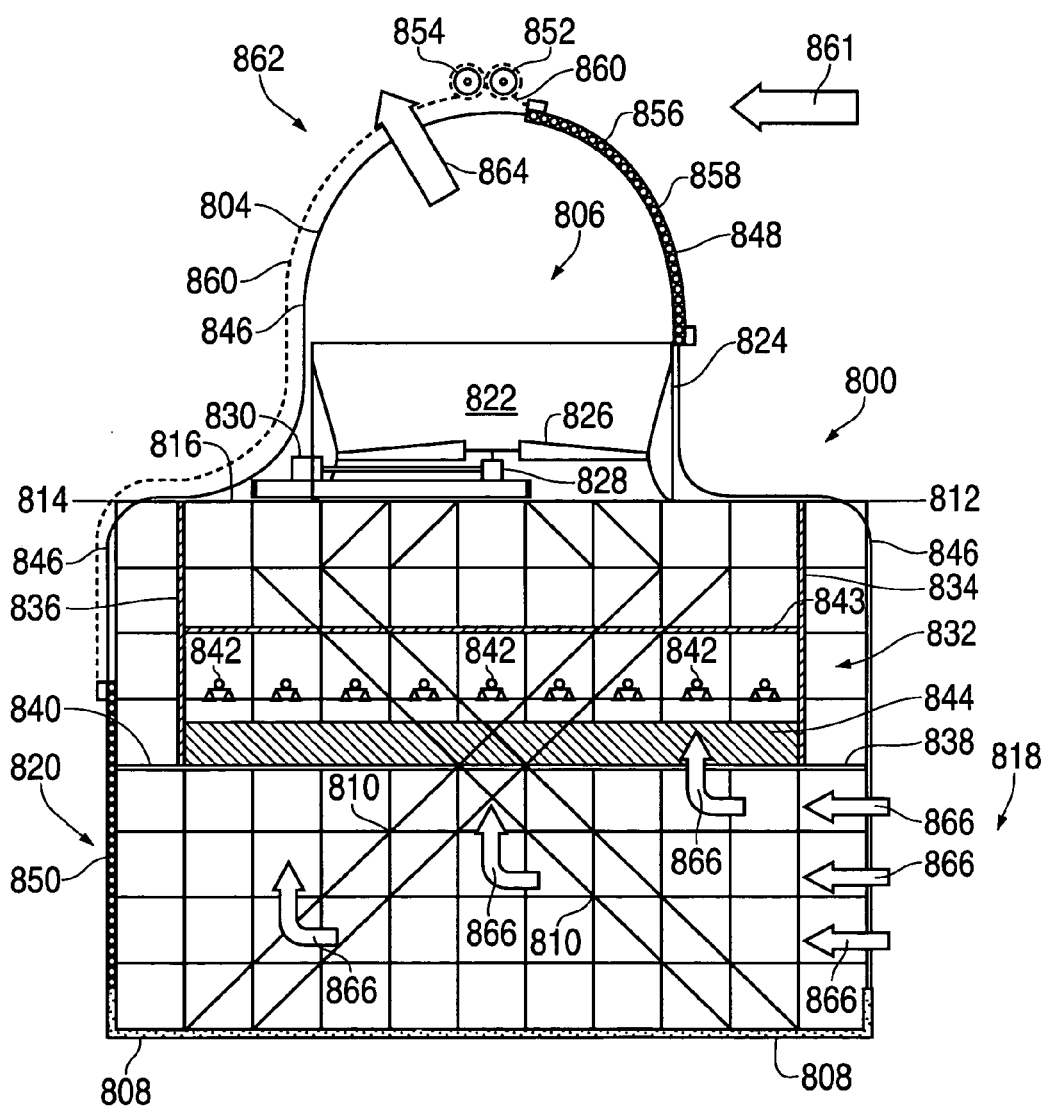
FIG. 12 is a schematic cross sectional view of a heating tower oriented in a first configuration in accordance with another embodiment of the present invention.
Figure 13:
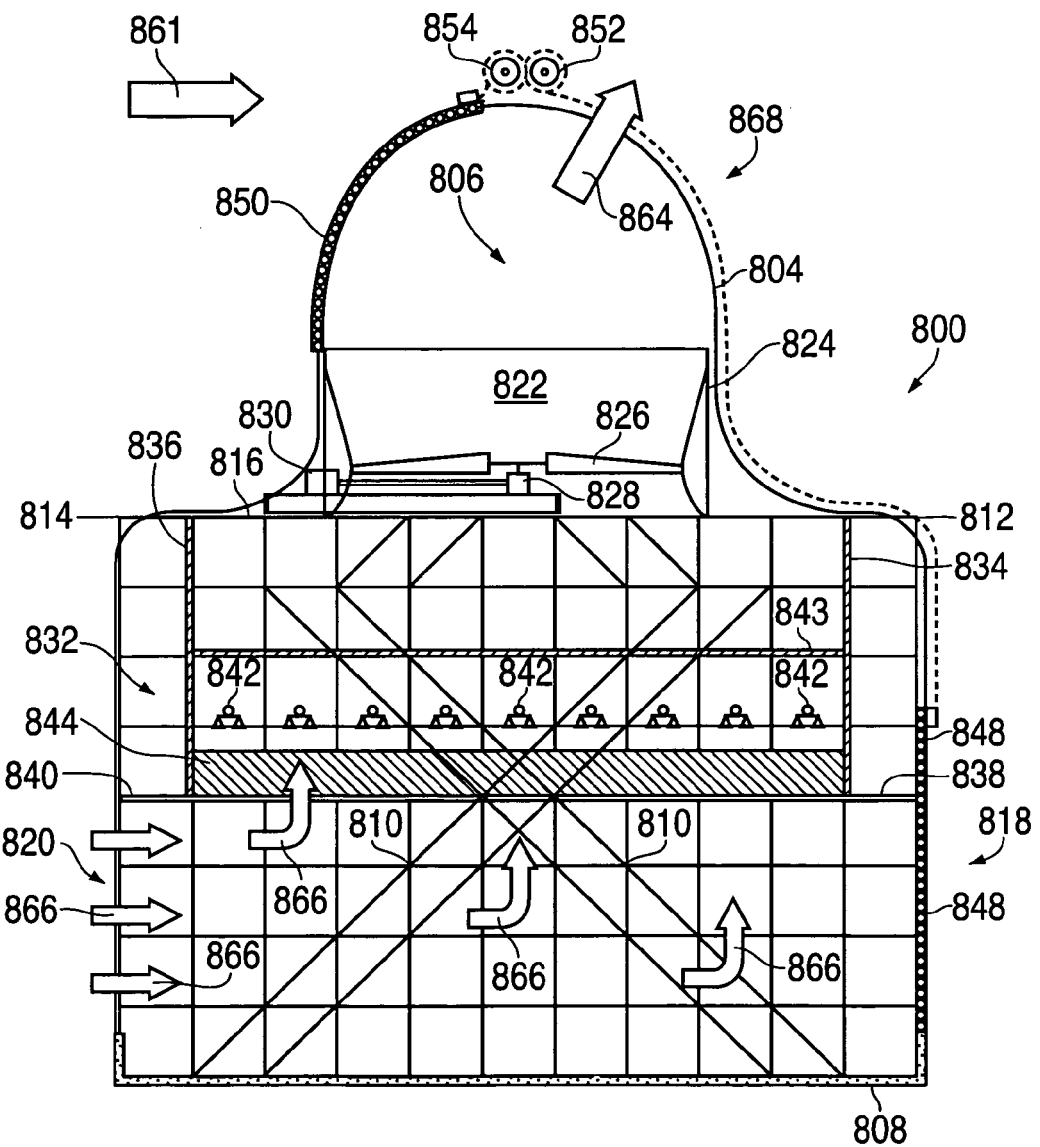
FIG. 13 is a schematic cross sectional view of the heating tower depicted in FIG. 12 oriented in a second configuration in accordance with an embodiment of the present invention.
Figure 14:
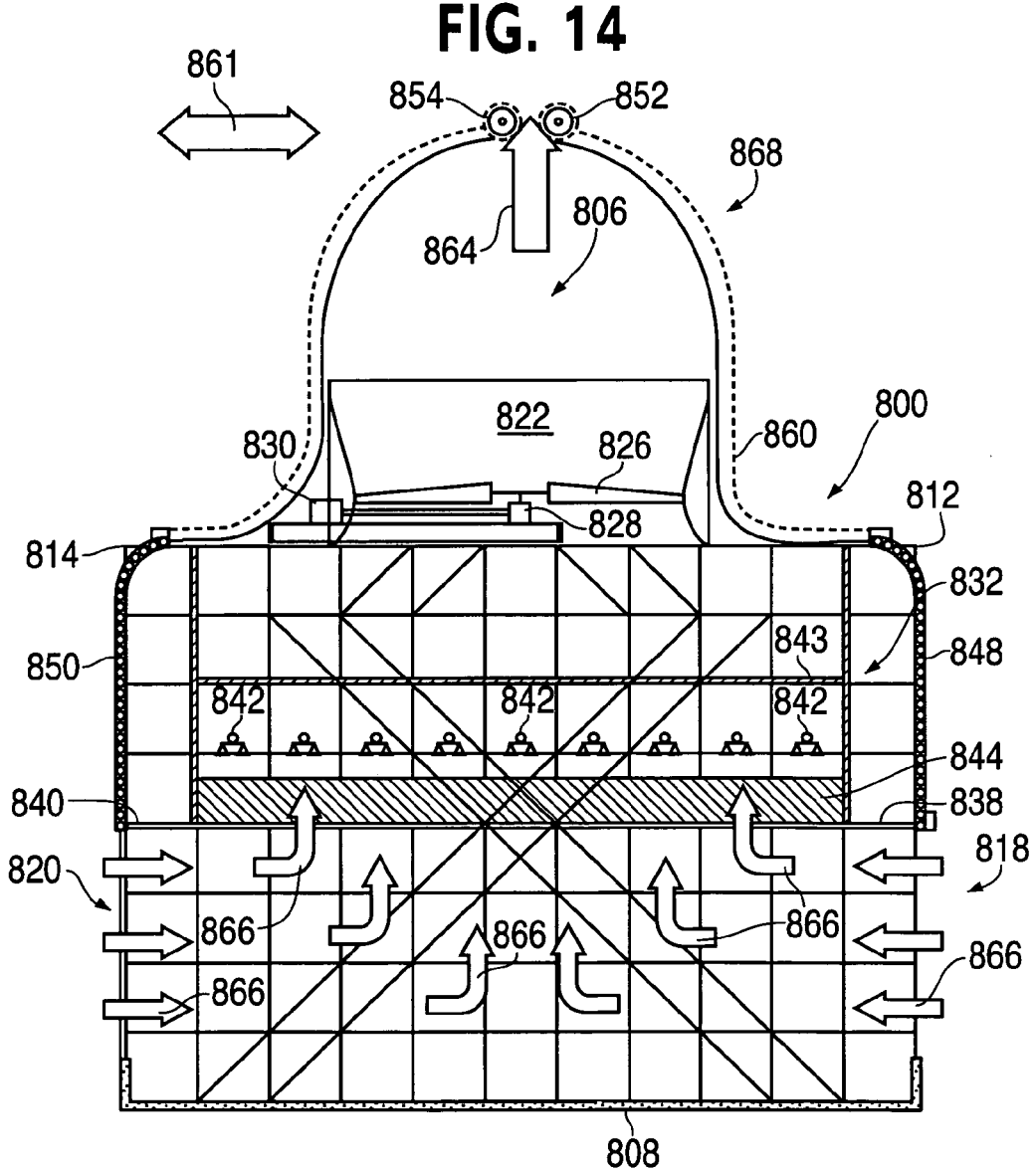
FIG. 14 is a schematic cross sectional view of the heating tower depicted in FIGS. 12 and 13 oriented in a third configuration in accordance with an embodiment of the present invention.

Referring now to FIGS. 12-14, a cross sectional view of a heating tower is schematically depicted 800, having a vertical axis 802 and a roll-up door stack hood 804 that generally defines the heating tower 800 air outlet 806. While a cross sectional view of a single heating tower cell is depicted, the heating tower 800 may employ multiple heating tower cells. As illustrated in FIG. 12, the heating tower 800 is a mechanical draft, counter flow heating tower 800 having a water basin 808 and a frame assembly or structure 810 to which the water basin 808 is connected. The frame assembly or structure 810 extends horizontally to define first and second side framing 812 and 814 which extend generally parallel to the vertical axis 802. The frame assembly or structure 810 also extends vertically along the vertical axis away from the water basin to define an upper or top portion 816.

The frame assembly 810 includes first and second opposing air inlets 818 and 820, each extending upwardly from the water basin 808. The heating tower 800 also includes a fan stack or shroud 822 connected to the top portion 816 of the heating tower 800. The fan stack or shroud 822 has a partition 824 attached thereto. The partition 824 extends between the shrouds of multiple cell heating towers, for example, and prevents the likelihood of heating tower effluent from exiting the shroud then traveling between the respective cells and re-entering the cells. The shroud 822 includes a fan or blade assembly 826 disposed therein. As illustrated in FIG. 12, the fan or blade assembly 826 is rotated by a gear structure 828 which in turn is driven by a motor 830.

As illustrated in FIGS. 12-14, the heating tower 800 is a counter flow heating tower that utilizes a wet section, generally designated 832, having first and second opposing side walls 834, 836. Each of the first and second side walls 834, 836 of the wet section extends from a respective base wall 838 and 840, each of which is positioned vertically adjacent to the opposing air inlets 818 and 820. The wet section 832 also includes a plurality of liquid spray nozzles 842. The heating tower 800 also includes a fill assembly 844 for heat exchange that directly underlies the liquid spray nozzles 842. The heating tower 800 may also employ a drift eliminator 843, for example, positioned directly above the spray nozzles 842. As depicted in FIGS. 12-14, the fill assembly 844 extends at least partially, and preferably all the way between the opposing side walls 834, 836 of the wet section 832. The fill assembly 844, as depicted, is made up of a number of counter flow film fill packs with each fill pack comprising a plurality of individual counter-flow film fill sheets connected to one another.

The film packs can be various sizes and dimensions depending upon the size and dimensions of the heating tower in which they are employed. The film fill packs are supported in the wet section 832 by the frame assembly 810 of the heating tower 800 along with the sidewalls 834, 836 of the wet section 832. In one embodiment, the individual fill sheets may hang from wire loops, for example, which wrap around fill support tubes that extend from the frame assembly 810 and run transversely to the film fill sheets. In another embodiment, the fill or fill assembly may be bottom supported fill. In these embodiments, the fill sits on longitudinal framing girts and additional joists that sit on the transverse girts, for example. Alternatively, the fill assembly 844 may utilize a series of splash bars to conduct heat exchange. In these embodiments, the splash bars extend to and from designated points of the frame assembly 810, directly under the liquid distribution nozzles 842.

As previously mentioned, the heating tower 800 illustrated in FIGS. 12-14 includes a roll-up door stack hood 804 which generally defines the heating tower outlet 806. The roll-up door stack hood 804 extends from the upper portion 816 of the frame assembly 810 and includes a rolling door track and framing 846 which provide a path upon which, first and second rolling doors 848, 850 may travel. As depicted in FIGS. 12-14, the aforementioned track and framing 846 enclose the roll-up door stack hood 804 and extend along the side framing 812, 814 of the heating tower 800. The track and framing 846 extend along the side framing 812, 814 as previously discussed. The track and framing 846 include first and second motor driven actuating apparatus 852 and 854 that function to actuate and position their respective rolling doors 848, 850. Whereas the first actuating apparatus 852 powers and positions the first rolling door 848, the second actuating apparatus 854 powers and positions the second rolling door 850. The actuating apparatuses 852, 854 may be any apparatus used to propel the rolling doors along the track and framing 846, for example winches or the like. Alternatively, the rolling doors 848, 850 may be propelled or driven by Power & Free Conveyors, manufactured by Pacline Overhead Conveyors, Mississauga Ontario.

The rolling door track and framing 846 provide a generally semi-circular travel path over the air flow outlet 806, allowing the rolling doors 848, 850 to be selectively oriented at desired positions via the actuating apparatuses 852, 854.

This selective positioning allows for the heating tower effluent to the exit the heating tower 800 in varying directions as desired and/or required. Also, as previously described, each of the side framing 812, 814 extends beyond the wet section 832 and wet section sidewalls 834, 836 as compared to the counterflow embodiment of the present invention depicted in FIG. 3, for example. This orientation of the sidewalls 834, 836 allows for the first rolling door 848 to travel along the sidewall and clear the wet section 832 of the heating tower 800. This orientation also allows for the first air flow inlet 818 selectively opened or closed. Likewise, the above-described orientation of allows the second rolling door 850 to travel along the sidewall 814 and clear the wet section 832 while enabling the second air flow inlet 820 to be selectively opened and closed.

As illustrated in FIGS. 12-14, each of the rolling doors 848, 850 is a flexible door comprising a series of metal or plastic panels 856 connected to one another via rollers or wheels 858. Alternatively, the panels 856 may be hingedly connected to one another. The individual rolling doors 848, 850 can be any desired length, however each door preferably has a length that ranges from approximately 6'-8' to approximately 12'-18'. The rolling doors 848, 850 may be propelled, for example, via a series of cables or chains 860 connected to the actuating apparatuses 852, 854. The cables 860 are tethered or connected to at least one end of the of the rolling doors 848, 850 and can extend about the periphery of the heating tower 800, as depicted in FIGS. 12-14. The extension and/or retraction of the cables 860 by the actuating apparatuses 852, 854, which in turn cause the rolling doors 848, 850, to move along the rolling door track and framing 846.

The operation of the rolling doors 848, 850 enables the heating tower 800 to switch to different configurations in response to varying atmospheric conditions such as wind conditions. For example, referring now to FIG. 12, the heating tower 800 is oriented in a first configuration, wherein wind conditions exist such that the wind is blowing in the direction indicated by the arrow 861 or, alternatively, there is little or no wind. In this first configuration, the second rolling door 850 is in the complete retracted position so that it covers the second air flow inlet 820. In this first configuration, the first rolling door 848 is extended and positioned on the roll-up door stack hood 804 at a first position, which provides a first exit path 862 for heating tower effluent to exit the roll-up door stack hood 804 as indicated by the arrow 864. Also, while in this first configuration, due to the above-described positioning of the first rolling door 856, the first air flow inlet 818 is in the open position enabling air to flow through the inlet 818 and enter the heating tower 800.

Again referring to FIG. 12, during operation in the first configuration, the first airflow inlet 818 is open and air is drawn into the heating tower 800 via the fan assembly 826, and proceeds to the wet section 832, as indicated by the arrows 866. As the air is drawn into the heating tower 800 as indicated by the arrows 866, it flows through the fill assembly 844 where heat exchange occurs and the air or effluent becomes cool. The cool effluent then proceeds to flow through the drift eliminator 843 and through the fan shroud 822, and out the air flow outlet 806. The cool effluent then exits the roll-up door stack hood 804 via the first exit path 862 as indicated by the arrow 864.

As illustrated in FIG. 12, the above-described heating tower 800 configuration functions to help isolate the flow of cool air or effluent exiting the first exit path 862 of the roll-up door stack hood 804 form the air flow entering the first inlet 818 by discharging the cool effluent in the direction of the wind flow 861. Therefore, in windy atmospheric conditions, for example, this configuration helps to reduce the occurrence of recirculation. More specifically, this configuration allows the cool air or effluent to be discharged in the direction of the wind, reducing the likelihood of the heating tower effluent from exiting the heating tower 800 and re-entering through the first air inlet 818.

Referring now to FIG. 13, the heating tower 800 may be operated in a second configuration, opposite the first configuration discussed in connection with FIG. 12. As depicted by the arrow 861, the wind flow is now in a second, opposite direction, or, alternatively, the wind flow is very light. In this second configuration, the first rolling door 848 is in the complete retracted position so that it covers the first air flow inlet 818. In this second configuration, the second rolling door 850 is extended and positioned on the roll-up door stack hood 804 at a second position opposite the first. This second position provides a second exit path 868 for heating tower effluent to exit the roll-up door stack hood 804 as indicated by the arrow 864. Also, while in this second configuration, due to the above-described positioning of the second rolling door 850, the second air flow inlet 820 is in the open position enabling air to flow through the inlet 820 and enter the heating tower 800.

Again referring to FIG. 13, during operation in the second configuration, the second airflow inlet 820 is open and air is drawn into the heating tower 800 via the fan assembly 826, and proceeds to the wet section 832, as indicated by the arrows 866. As the air is drawn into the heating tower 800 as indicated by the arrows 866, it flows through the fill assembly 844 where heat exchange occurs and the air or effluent becomes cool. The cool effluent then proceeds to flow through the drift eliminator 843 and through the fan shroud 822, and out the air flow outlet 806. The cool effluent then exits the roll-up door stack hood 804 via the second exit path 868 as indicated by the arrow 864.

As illustrated in FIG. 13, the above-described second heating tower 800 configuration functions to help isolate the flow of cool air or effluent exiting the second exit path 868 of the roll-up door stack hood 804 from the air flow entering the second inlet 820 by discharging the cool effluent in the direction of the wind flow 861. Therefore, in windy atmospheric conditions, for example, this configuration helps to reduce the occurrence of recirculation. More specifically, this configuration allows the cool air or effluent to be discharged in the direction of the wind, reducing the likelihood of the heating tower effluent from exiting the heating tower 800 and re-entering through the second air inlet 820.

Referring now to FIG. 14, the heating tower 800 is illustrated in a configuration that is an alternative configuration to those depicted in FIGS. 12 and 13. This configuration may be utilized in moderate to high wind conditions. In this configuration, both rolling doors 848, 850 are positioned in a third position, along each respective side framing 812, 814, adjacent the wet section 832. Due to the aforementioned positioning of the rolling doors 848, 850, both air flow inlets 818, 820 are open as indicated by the arrows 866. Furthermore, due to the positioning of the rolling doors 848, 850, the cool effluent may directly exit the roll-up door stack hood 804 and is not deflected in one direction or the other as in the previously described configurations.

Figure 15:
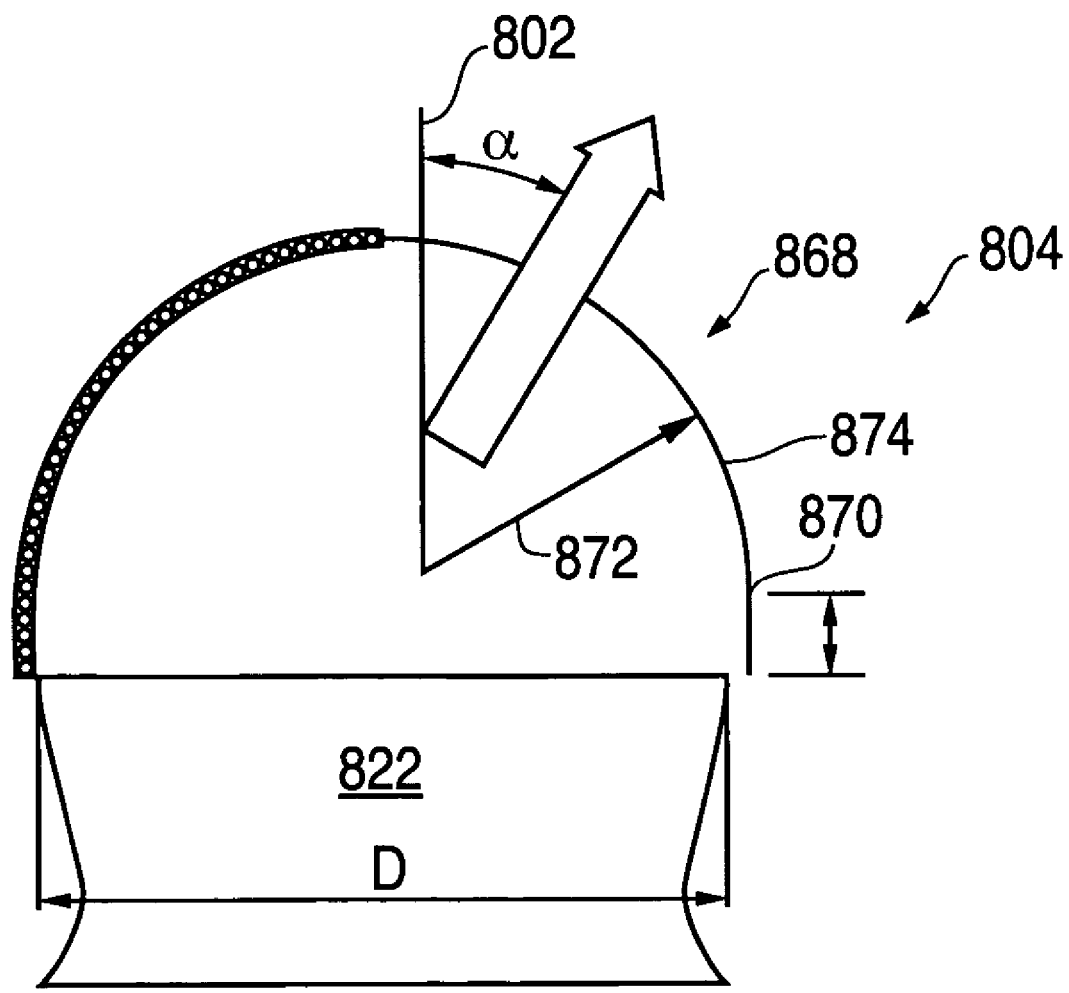
FIG. 15 is a schematic cross sectional view of a roll-up door stack hood in accordance with an embodiment of the present invention.

Referring now to FIG. 15 a detailed view of the roll-up door stack hood 804 is depicted. As illustrated in FIG. 15, the roll-up door stack hood 804 has a lower straight portion 870 that has a length that is equal to approximately D/8 wherein D (as depicted in FIG. 15) is equal to the diameter of the fan stack or shroud 822. Furthermore, the radius 872 of the circular portion 874 of the roll-up door stack hood 804, is equal to approximately D/2. Accordingly, the above-described geometry of the roll-up door stack hood 804 produces a discharge angle α that is approximately 30 degrees from the vertical axis. Alternatively, roll-up door stack hood 804 may be configured to include a stationary flat portion verses the circular geometry of the roll-up door stack hood 804 that is illustrated.

Figure 16:
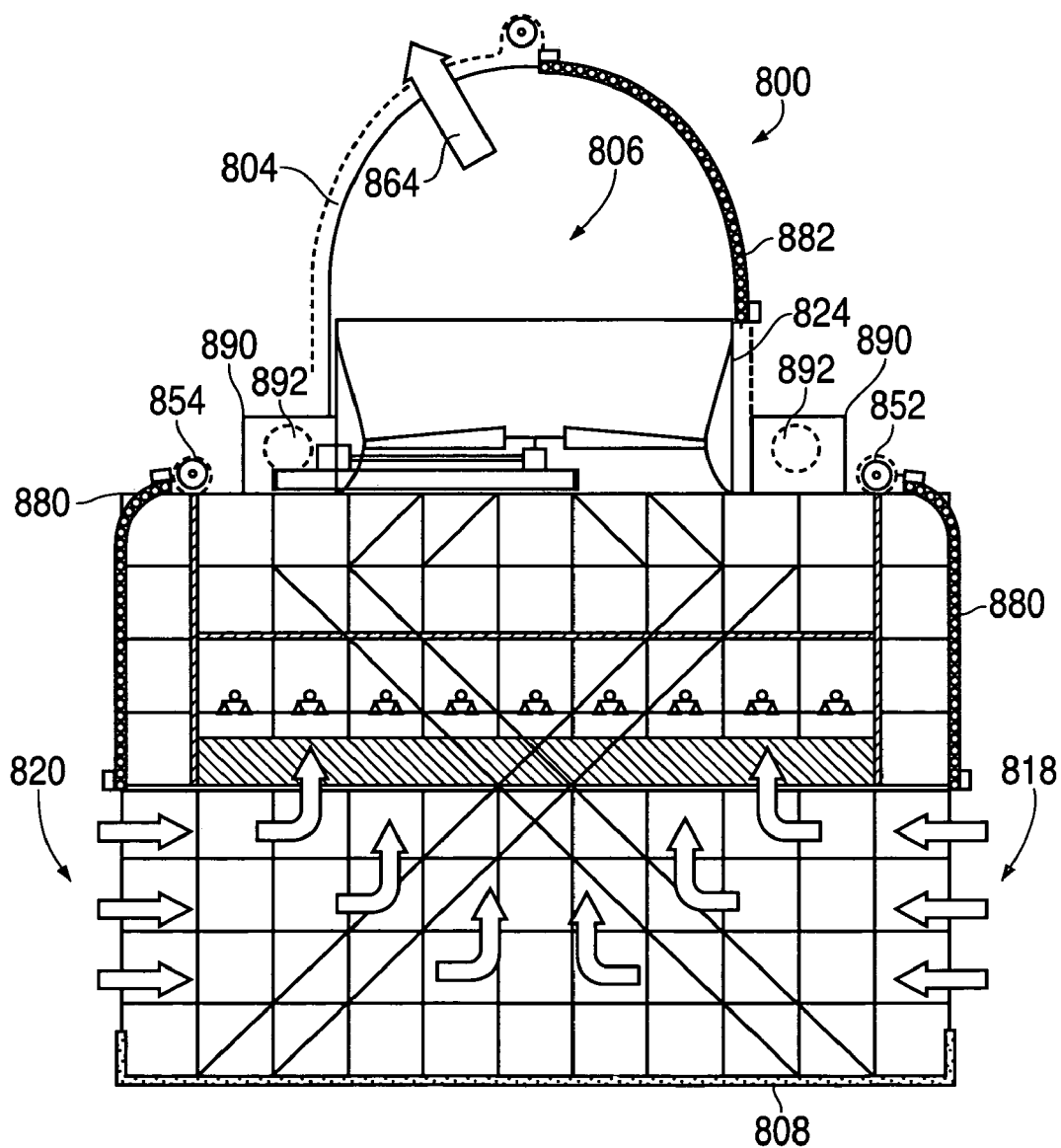
FIG. 16 is schematic cross sectional view of a heating tower in accordance with another embodiment of the present invention.

While the embodiments of the heating tower 800 depicted in FIGS. 12-15 utilize first and second rolling doors 848, 850, alternative embodiments encompassed by the present may include three rolling doors, for example, as illustrated in FIG. 16. In these embodiments, first and second inlet rolling doors, each designated 880, are extended and retracted across each respective air flow inlet 818, 820 and are utilized to open and close each respective air inlet 818, 820. However, the alternative embodiment depicted in FIG. 16 includes a third, door 882 which is utilized to change the direction of heating tower effluent as it exits the roll-up door stack hood 804 as previously described in connection with the prior embodiments. As illustrated in FIG. 16, the heating tower 800 embodiment includes a pair of spooling housings 890 in addition to the actuating apparatuses 852, 854, that function to translate the third rolling door at desired positions on the roll-up door stack hood 804. The spooling housings 890 include a spooling means 892 and operates the third door 882.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A heating tower apparatus for heating a liquid which falls in a generally downward direction along a vertical axis, wherein the heating tower has opposing first and second side walls, comprising:
   a frame assembly that supports the heating tower;
   a liquid distribution assembly;
   a fill medium, wherein said liquid distribution assembly distributes liquid onto said fill medium;
   a hood that extends from said frame assembly, wherein said hood has a diameter D and has a shroud disposed therein and wherein said hood provides an air flow outlet;
   a track connected to said frame assembly, wherein said track extends at least partially around said frame assembly and said hood;
   a first air flow inlet that provides a first inlet air flow stream;
   a second air flow inlet that provides a second inlet air flow stream;
   a first door connected to said track, wherein said first door moves along said track between said hood and said first air flow inlet;
   a second door connected to said track, wherein said second door moves along said track between said hood and said second air flow inlet;
   a first actuating apparatus mounted to said frame assembly, wherein said first actuating apparatus is connected to said first door and extends and retracts said first door between the hood and the first air flow inlet; and
   a second actuating apparatus mounted to said frame assembly, wherein said second actuating apparatus is connected to said second door and extends and retracts said second door between said hood and said second air flow inlet,
   wherein the heating tower is operable in a first configuration in which said first door is extended in a first position on said hood and said second door is retracted in a second position over said second air flow inlet and wherein said first air flow inlet is open in said first configuration and said second air flow inlet is closed in said first configuration.

2. The heating tower according to claim 1, wherein the heating tower is operable in a second configuration in which said second door is extended in a third position on said hood and said first door is retracted in a fourth position over said first air flow inlet and wherein said second air flow inlet is open in said second configuration and said first air flow inlet is closed in said second configuration.

3. The heating tower according to claim 2, wherein the heating tower is operable in a third configuration in which said first door is oriented in a fifth position along the vertical axis vertically adjacent to said first air flow inlet and the second door is oriented in a sixth position along the vertical axis vertically adjacent to said second air flow inlet.

4. The heating tower according to claim 2, wherein the air flow outlet provides a discharge angle equal to approximately 30 degrees from the vertical axis.

5. The heating tower according to claim 1, wherein said first air flow inlet opposes said second air flow inlet.

6. The heating tower according to claim 1, wherein said first actuating apparatus is connected to said first door via cable and/or chain and wherein said second actuating apparatus is connected to said second door via cable and/or chain.

7. The heating tower according to claim 1, wherein said first and second doors each comprise a plurality of flexible panels connected to one another via a series of rollers or wheels.

8. The heating tower according to claim 1, further comprising a partition attached to said shroud.

9. The heating tower according to claim 3, wherein said hood comprises:
   a generally semi-circular portion that extends vertically above said shroud along the vertical axis, wherein said generally semi-circular portion has a radius;
   a first straight portion connected to said semi-circular portion; and
   a second straight portion connected said semi-circular portion, wherein said first and said second straight portions oppose one another.

10. The heating tower according to claim 9, wherein said radius is equal to approximately D/2.

11. The heating tower according to claim 10, wherein said first straight portion has a length equal to approximately D/8 and said second straight portion has a length equal to approximately D/8.

12. The heating tower according to claim 9, further comprising a third door connected to said track, wherein said door moves along said track.

13. The heating tower according to claim 12, wherein said heating tower is operable in a fourth configuration in which said third door is positioned along the hood and transitions between first and second straight portions only and wherein said first roll door transitions along the first sidewall only and the second rolling door transitions along the second sidewall only.

14. The heating tower according to claim 13, wherein said third door comprises a plurality of flexible panels connected to one another via a series of rollers or wheels.

15. The heating tower according to claim 14, wherein said first actuating apparatus and said second actuating apparatus each are connected to said third door via a cable and/or chain.

16. The heating tower according to claim 1, wherein said first actuating apparatus is a winch and wherein said second actuating apparatus is a winch.

17. A heating tower apparatus for heating a liquid which falls in a generally downward direction along a vertical axis, wherein the heating tower has opposing first and second side walls, comprising:

means for actuating a first door along a track to a first position on a hood having a diameter D, wherein in the first position a first air flow inlet is open and a first air flow outlet is provided;

means for actuating a second door along said track to a second position, wherein in the second position a second air flow inlet is closed;

means for drawing an air stream into the heating tower through the first air flow inlet;

means for passing the air stream over a fill medium;

means for discharging the air stream from the heating tower through the first air flow outlet; and means for isolating the inlet air flow stream from the outlet air flow stream.

* * * * *